J. D. SMITH.
LABELING MACHINE.
APPLICATION FILED MAR. 9, 1921.

1,402,262.

Patented Jan. 3, 1922.
15 SHEETS—SHEET 1.

Inventor
John D. Smith,
By Meyers, Cavanagh, Whitehead & Hyde
Attorneys

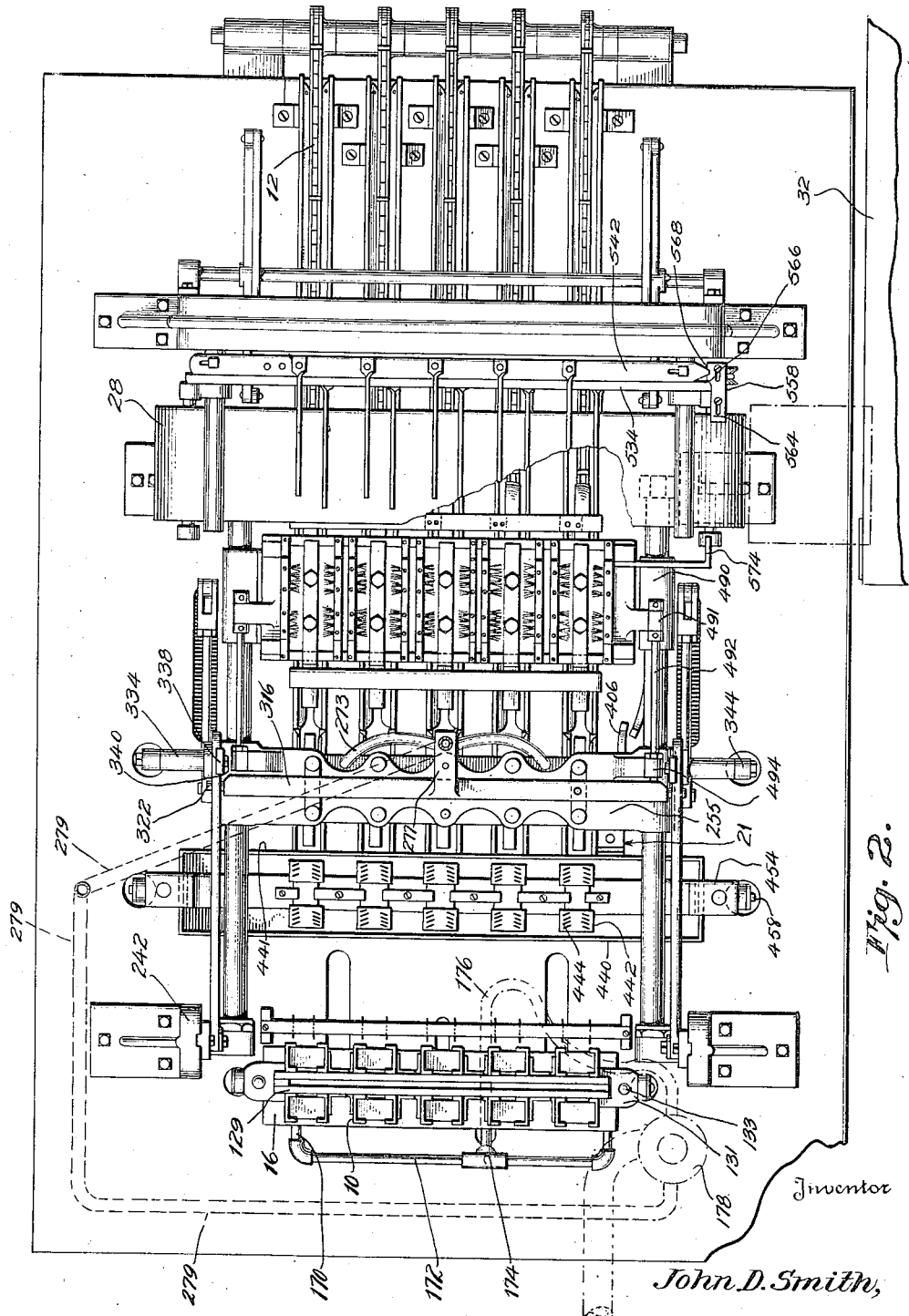

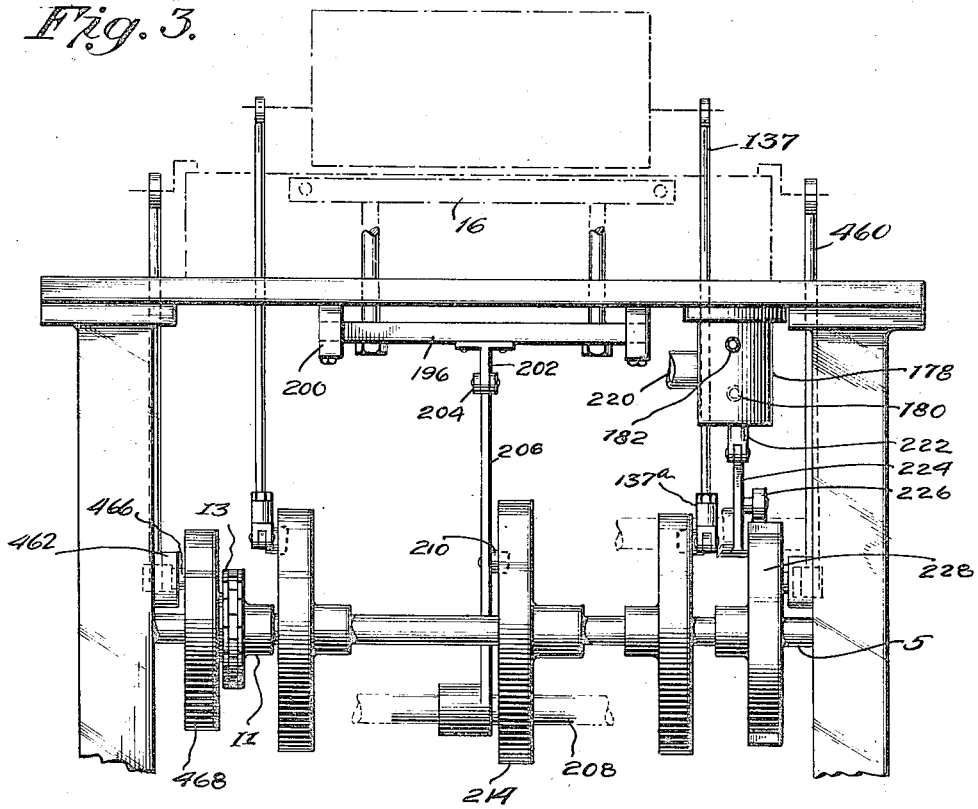
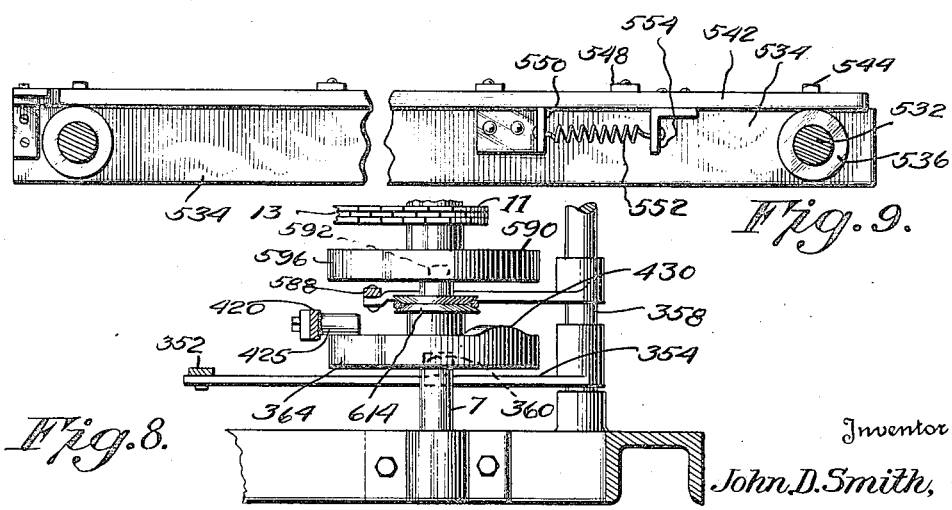

J. D. SMITH.
LABELING MACHINE.
APPLICATION FILED MAR. 9, 1921.

1,402,262.

Patented Jan. 3, 1922.

Inventor
John D. Smith,

Attorney

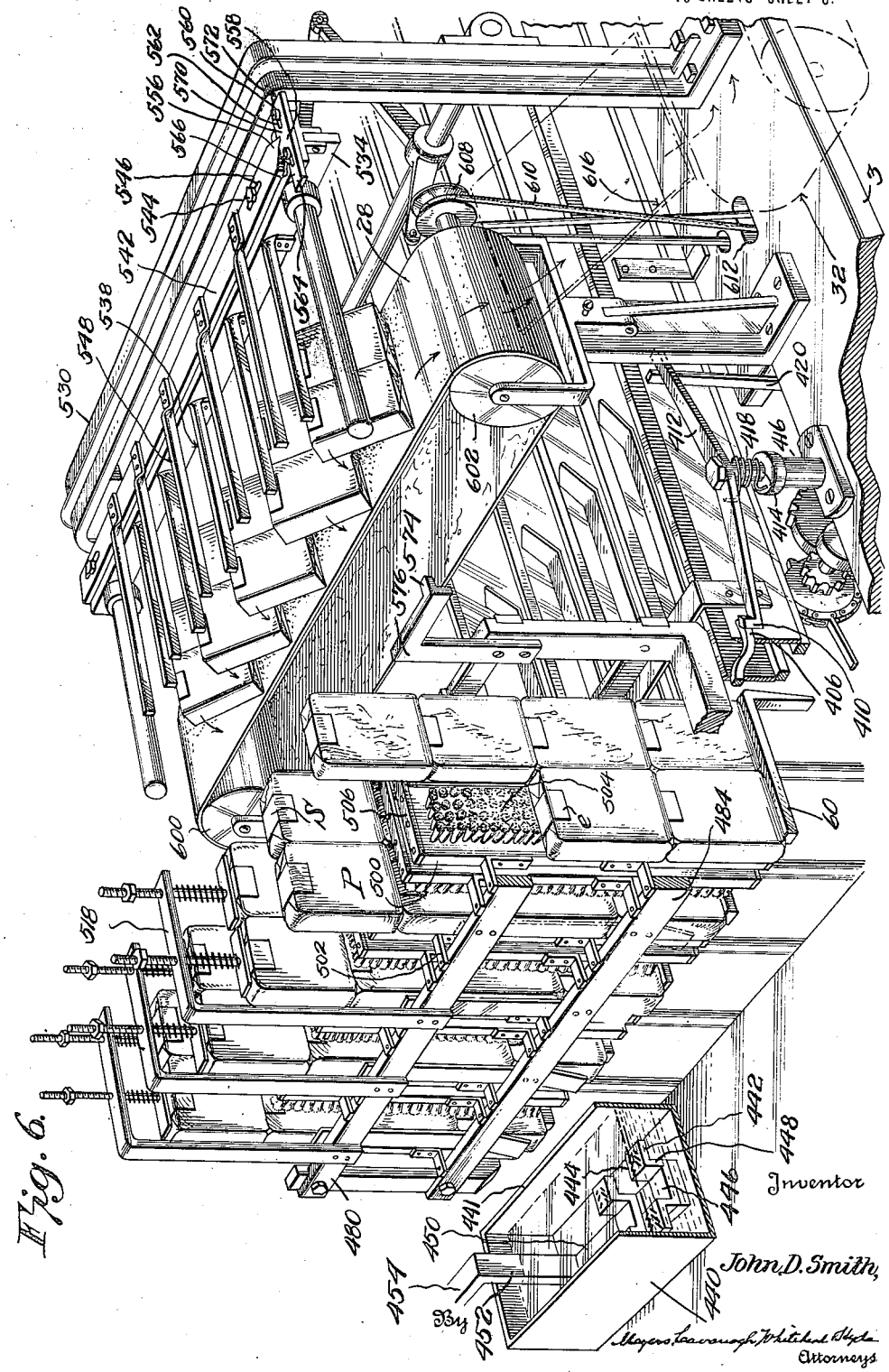

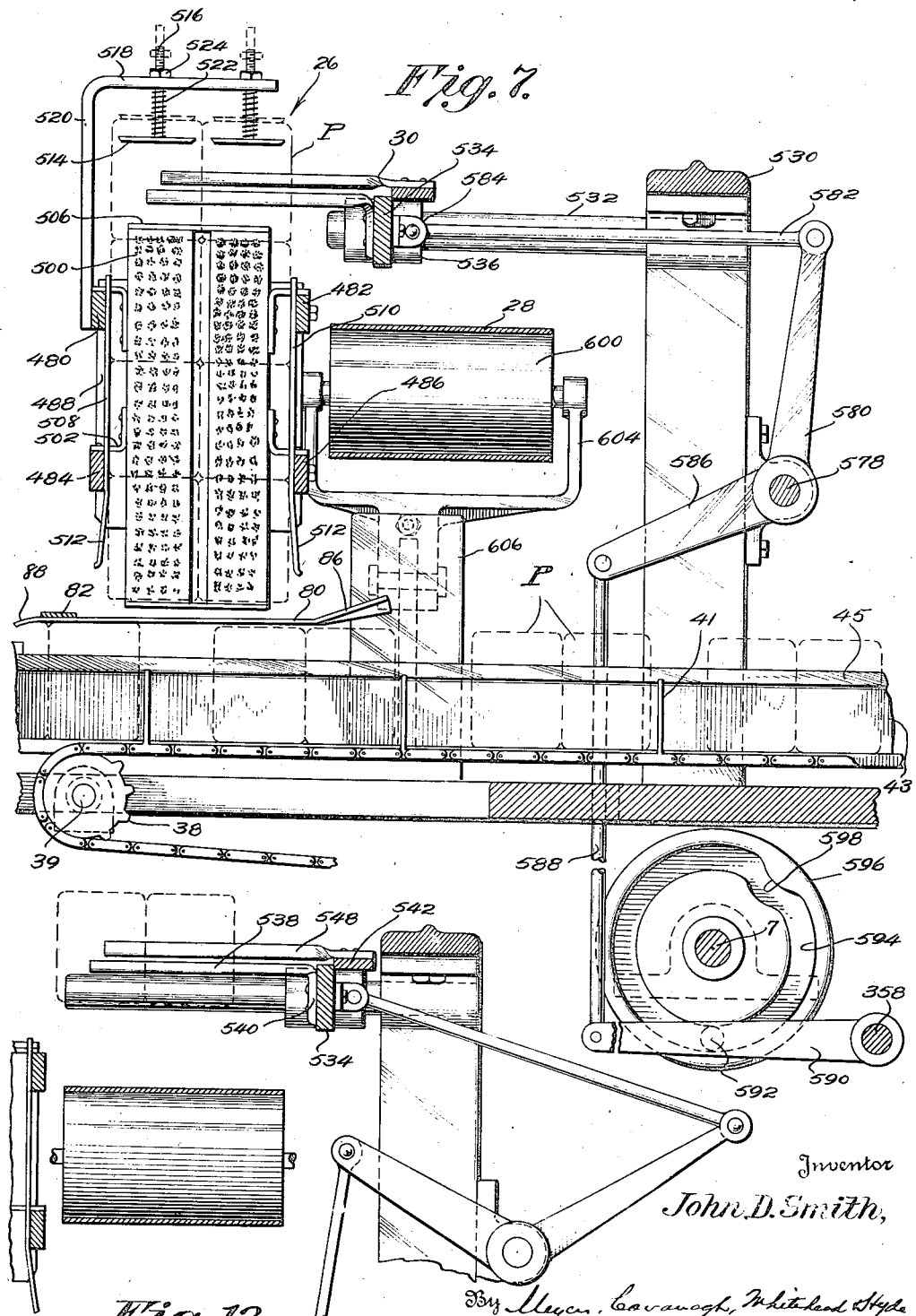

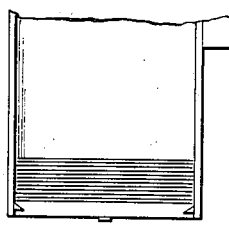
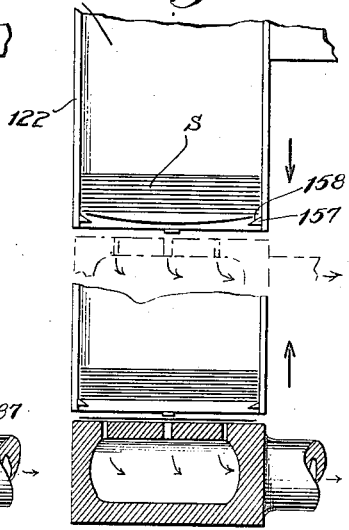
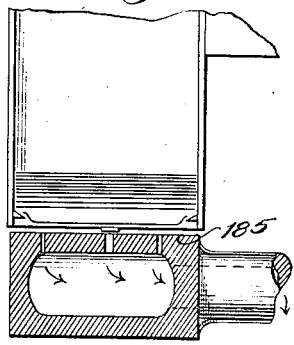
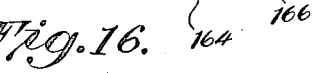
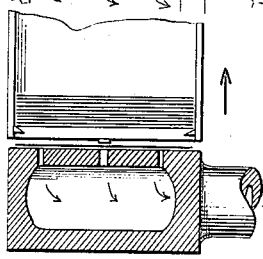
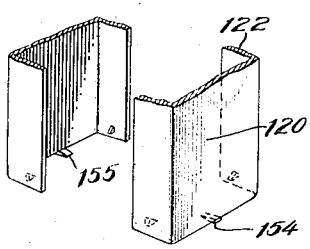
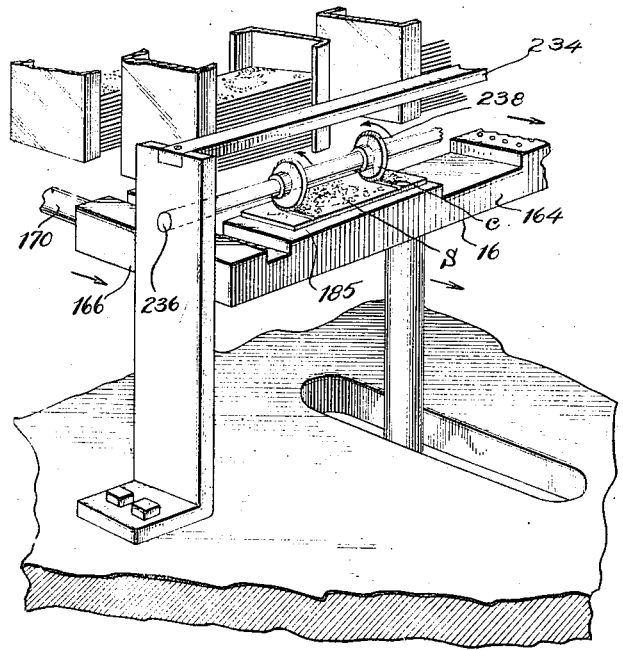
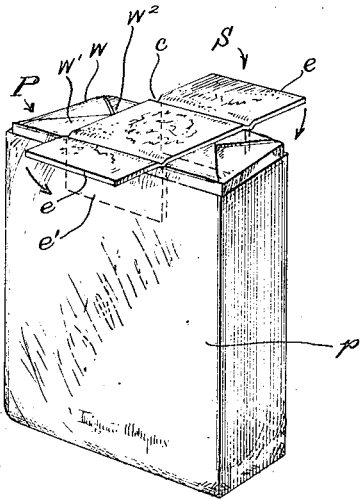

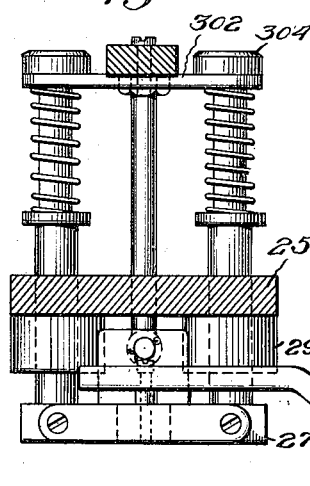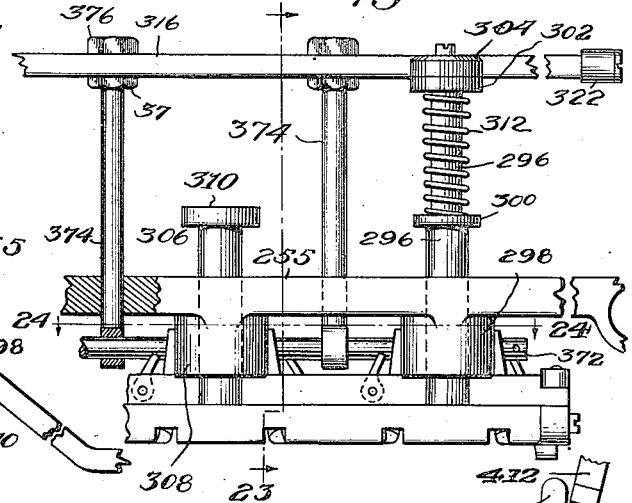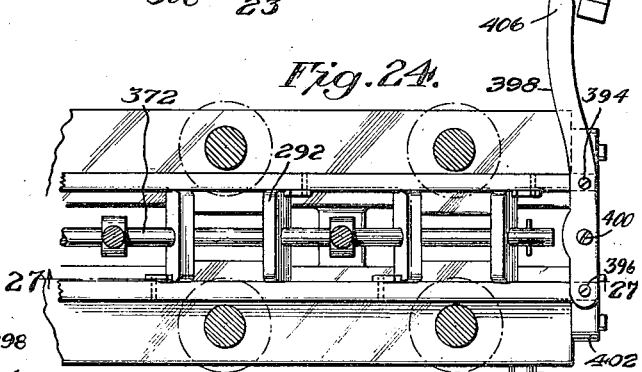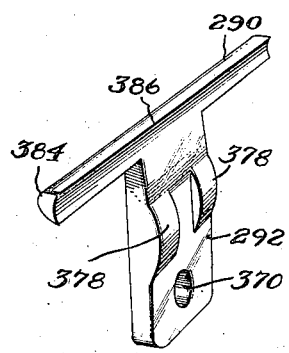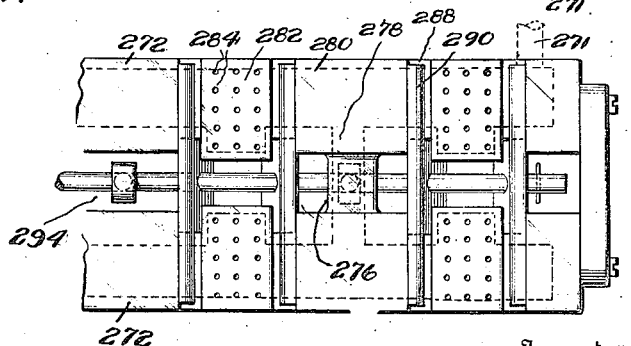

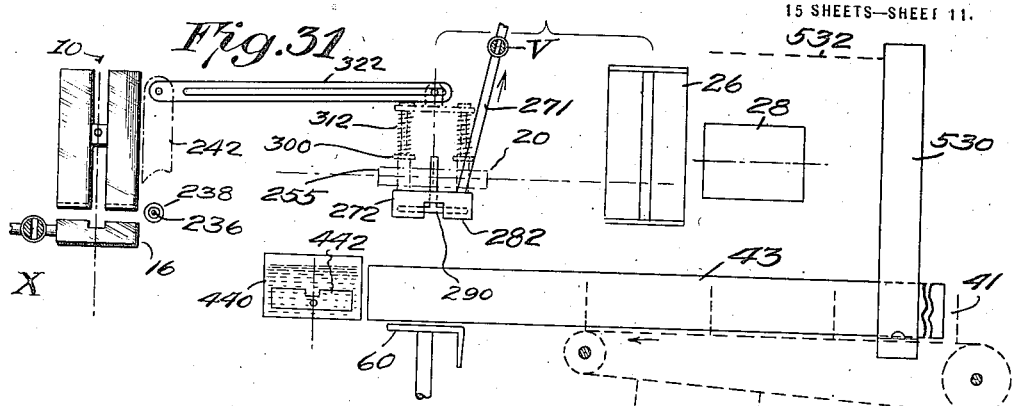
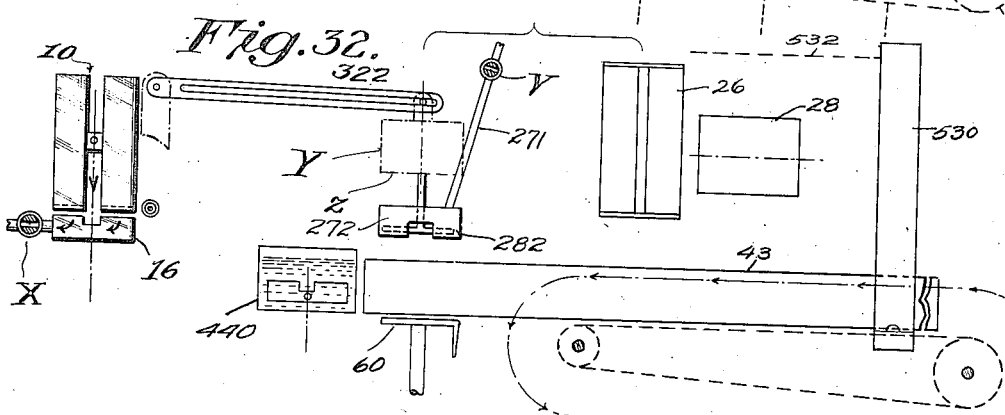
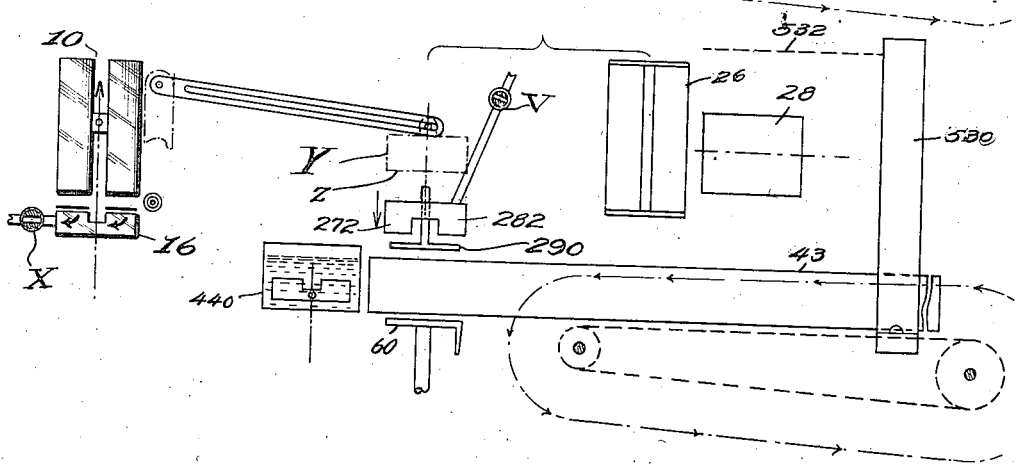

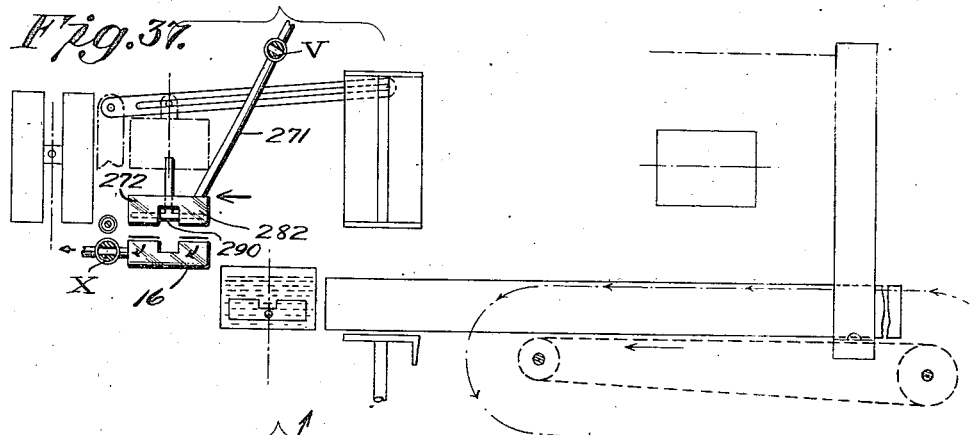
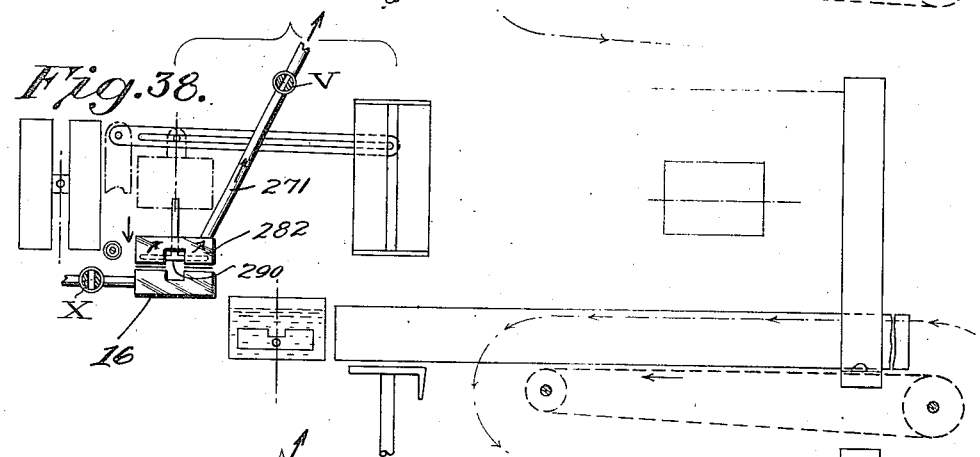
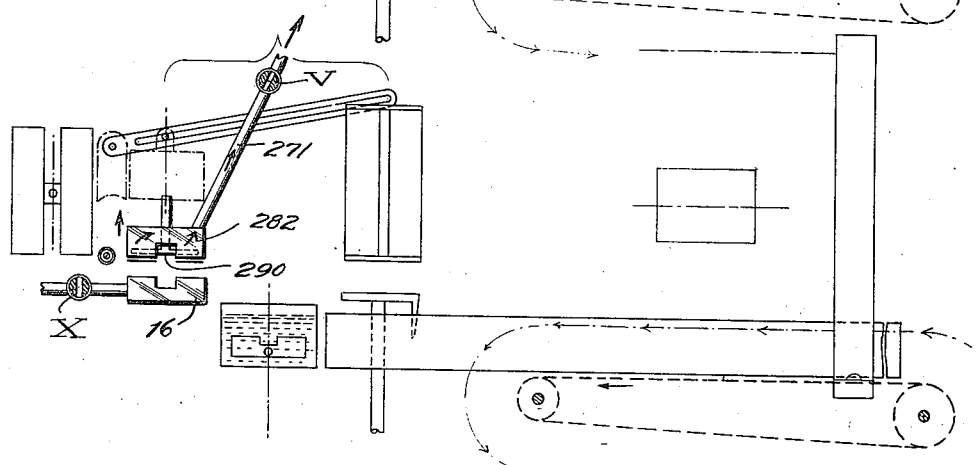

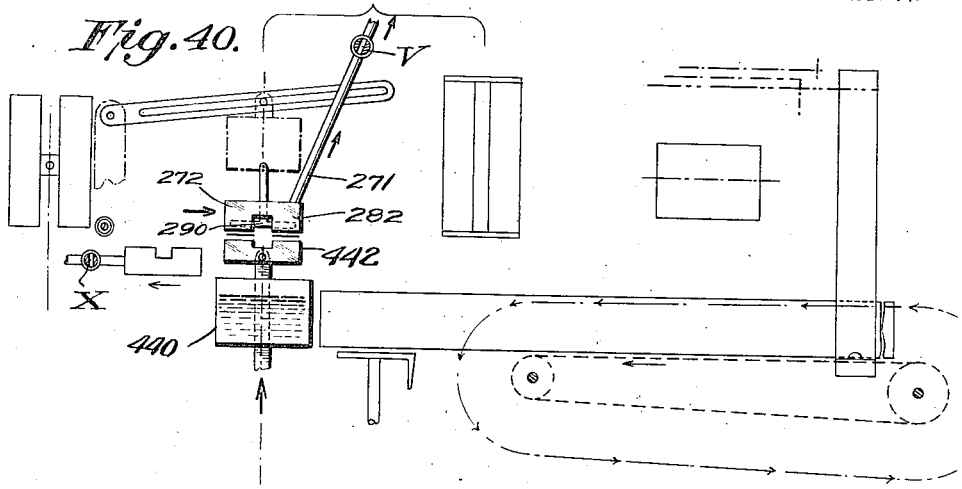
Fig. 40.
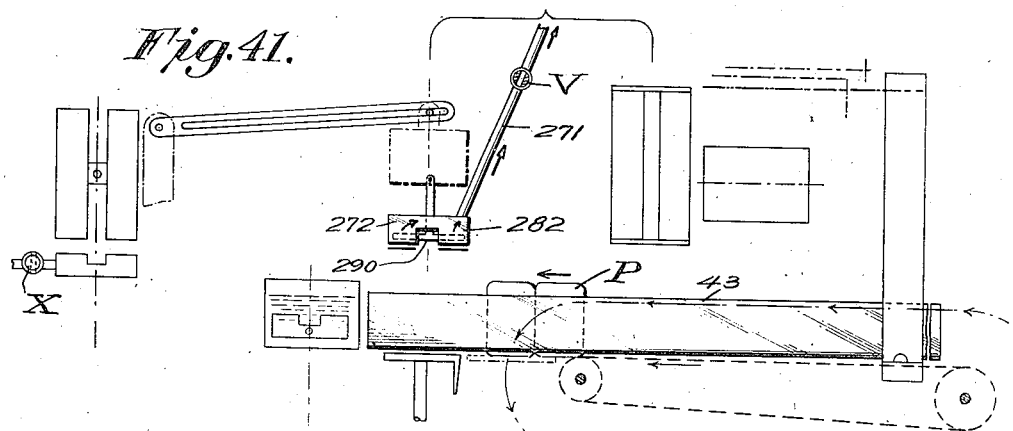
Fig. 41.
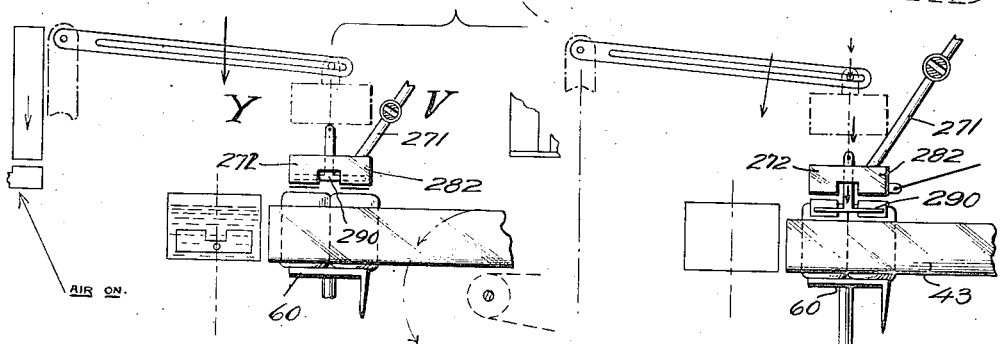
Fig. 42.
Fig. 43.

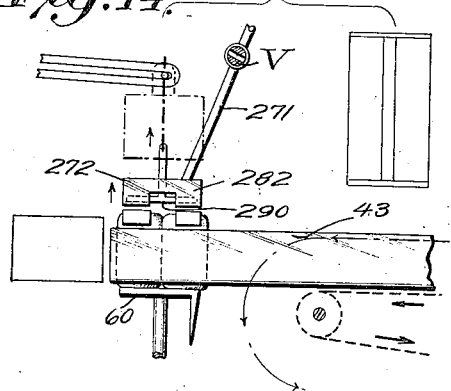
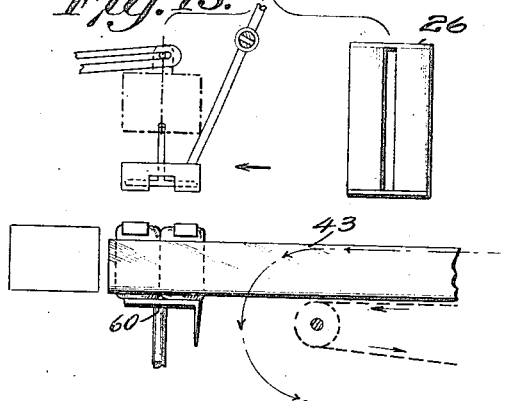
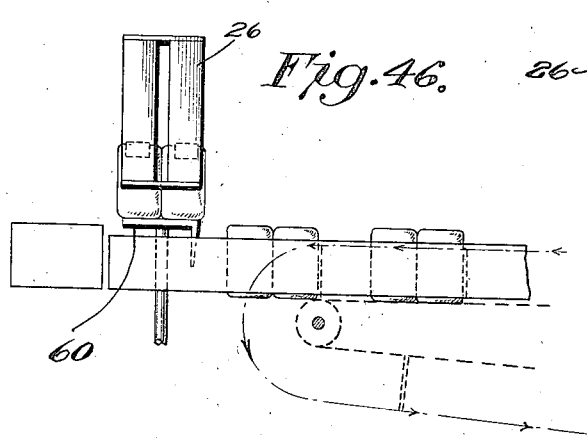
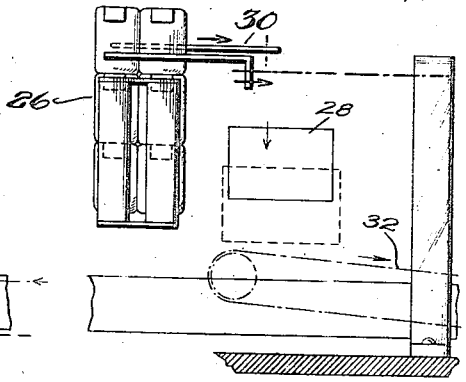
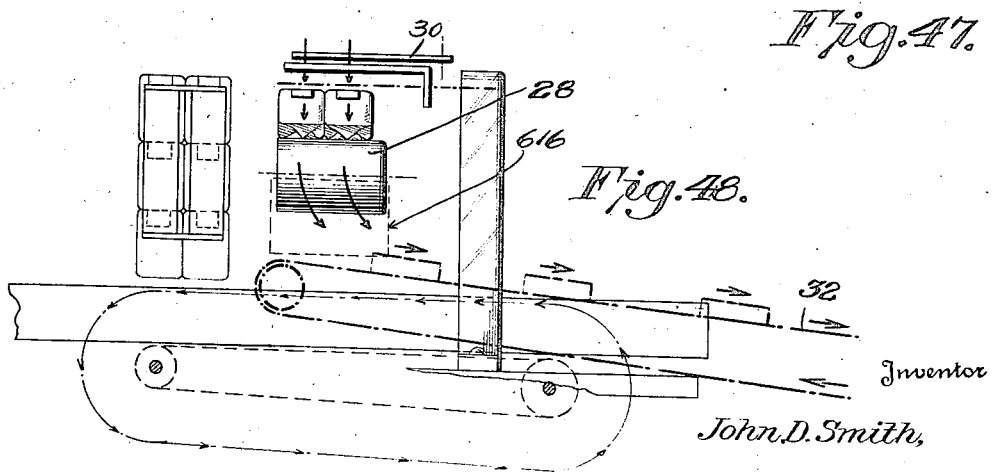

UNITED STATES PATENT OFFICE.

JOHN D. SMITH, OF RICHMOND, VIRGINIA, ASSIGNOR TO LIGGETT & MYERS TOBACCO COMPANY, OF NEW YORK, N. Y., A CORPORATION OF NEW JERSEY.

LABELING MACHINE.

1,402,262. Specification of Letters Patent. Patented Jan. 3, 1922.

Application filed March 9, 1921. Serial No. 451,078.

*To all whom it may concern:*

Be it known that I, JOHN D. SMITH, a citizen of the United States, and resident of Richmond, in the county of Henrico and State of Virginia, have invented certain new and useful Improvements in Labeling Machines, of which the following is a specification.

My invention relates to machines for applying labels to articles or packages. In the particular form of the invention here shown, it is especially arranged for applying revenue stamps to cigarette packages; and the labels are, therefore, frequently referred to as "stamps," and the labeled articles as "packages" or "cigarette packages;" but it will be evident after understanding the principles underlying this particular embodiment that the machine may be adapted for handling labels of different kinds, and for applying them to other articles or packages.

A general object of the invention is to provide improved, and entirely automatic, co-ordinated instrumentalities for advancing a large number of packages in a stated time, applying stamps to the individual packages, and carrying away the packages for group-packaging or other disposition.

Another object is to provide means for maintaining supply-groups of individual stamps at a supply station, each group corresponding to an individual package at the stamp applying station, and stamp handling mechanism arranged to seize in each operative cycle, a single stamp from each supply group, transfer it to the applying station, adhesively condition it during transfer, and apply it to the corresponding package, desirably also with special provision for insuring the adhesion of the stamp to the package, including turning down projecting ends of the stamps and pressing them securely against side-surfaces of the packages.

A further object, incidental to the foregoing, is to eliminate parts and operations required in certain previous machines for separating individual stamps from strips, before application of the stamps to individual packages.

Another object is to positively press the stamps upon the tops of the packages at the moment of application and thereupon to positively apply the ends of the stamps to the package sides, so that the stamp application is substantially completed at one package station.

A further object is to quickly remove the packages from the applying station and to substantially simultaneously apply stamp-retaining devices to the packages.

A further important object is to greatly increase the output of such machines by providing for the stamping simultaneously of, not only a row of packages, but two or more rows, each containing a plurality of individual packages.

Another important object is to provide for maintaining the stamps at the supply station in groups (usually stacks or vertical columns), face-up, and to remove the individual stamps successively from the bottoms of the columns, and to correspondingly arrange the stamp transferring, gluing and applying instrumentalities.

Another object is to provide in one preferred embodiment of the invention, as here shown, pneumatic stamp selecting or grasping devices, and more particularly to provide for transferring the stamps after they are withdrawn from the magazines by the primary pneumatic or suction device to a second pneumatic or suction device forming part of the stamp applying mechanism, the preferred mode of operation being such that the stamps are first removed from the magazines and supported on an upper surface of the initial stamp engaging and grasping device with their printed surfaces upward and are then engaged and held on an under surface of the secondary engaging or holding device with their blank surfaces downward and these surfaces are then adhesively coated before application to the packages.

The invention as physically embodied includes instrumentalities for accomplishing these and other objects, as sufficiently further explained in connection with a detailed description of the accompanying drawings, which show one exemplifying embodiment of the invention. After considering this, persons skilled in the art will understand that the invention may be embodied in different forms; also that many changes in details, as well as in combinations and sub-combinations of parts, may be made within the principles of the invention; also that certain parts and subcombinations of parts may be advantageously used in certain cases apart from others; and I contemplate the employment of any structures which are properly within the scope of the appended claims.

In the drawings:

Fig. 2 is a top plan view.

Fig. 3 is a front end elevation.

Fig. 6 is a perspective view showing mainly the gluing device, the vertical package feed and label retaining channels, and package take-off and discharge mechanism.

Fig. 7 is a longitudinal section showing substantially the same parts of the mechanism as Fig. 6.

Fig. 8 is a horizontal sectional detail showing mainly parts associated with the rear drive shaft.

Fig. 9 is a detail in transverse section of part of the package take-off or discharge mechanism.

Fig. 12 is an enlarged detail in vertical section of the package take-off and discharge mechanism.

Fig. 13 is an enlarged detail in longitudinal section of the lower end of one of the label magazines.

Figs. 14 to 17, inclusive, are detail views on a similar scale showing progressively the action of the label selector in withdrawing a label from the magazine.

Fig. 18 is a perspective detail of the lower ends of the two main side members of one of the label magazines.

Fig. 19 is a perspective detail showing mainly the label scoring mechanism.

Fig. 20 is a perspective view of a package, in this case a cigarette pouch package with a label, in this case a stamp, initially applied to the upper end.

Fig. 21 is an enlarged detail in vertical longitudinal section of the label applying mechanism.

Fig. 22 is a view from the right of Fig. 21, mainly in elevation and partly in section.

Fig. 23 is a vertical section at 23—23, Fig. 22.

Fig. 24 is a horizontal section at 24—24, Fig. 22.

Fig. 25 is a bottom plan view of one end of the label applying head and associated parts.

Fig. 26 is a perspective detail of one of the label pressing fingers.

Figure 27:
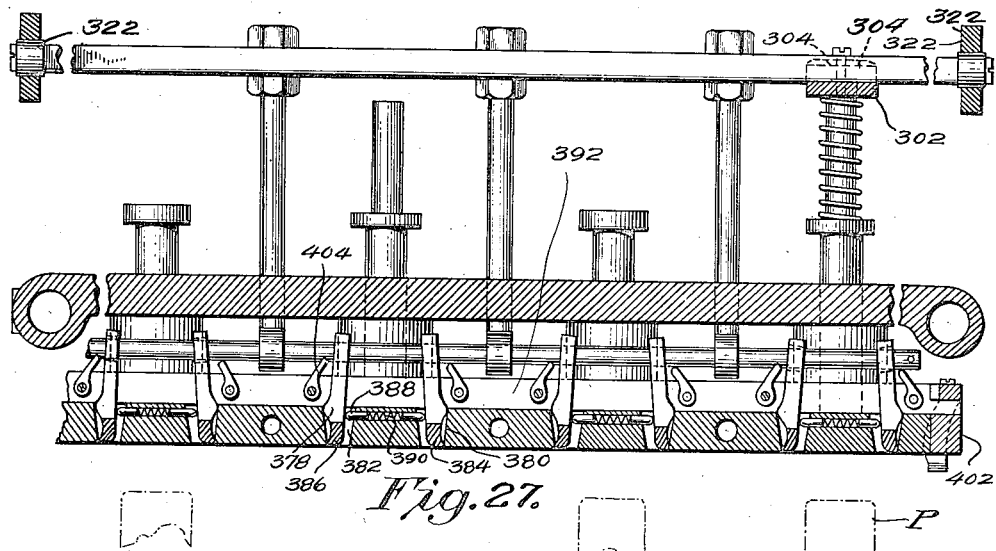

Fig. 27 is a vertical transverse section of the label applying head and operating means condensed laterally by breaking out parts.

Figures 28, 29:
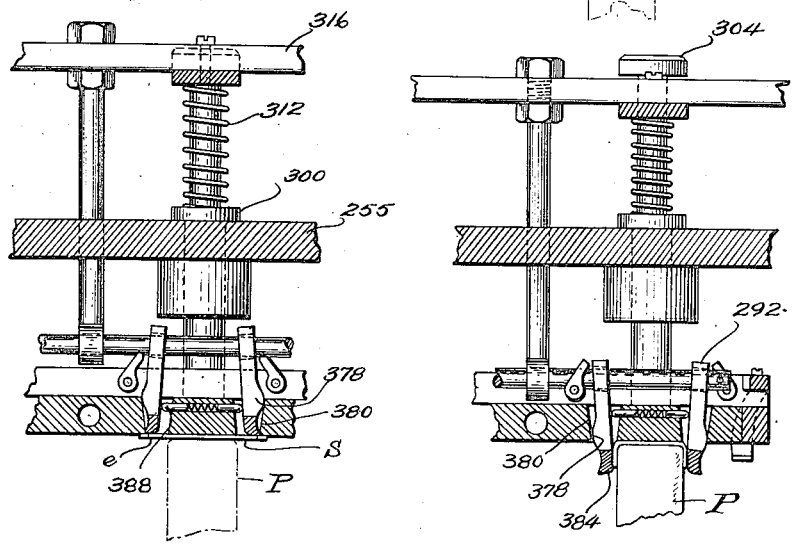

Fig. 28 is a detail showing one portion of the head, corresponding to a single label, in engagement with a package.

Fig. 29 is a similar view showing the parts in another operative position.

Figure 30:
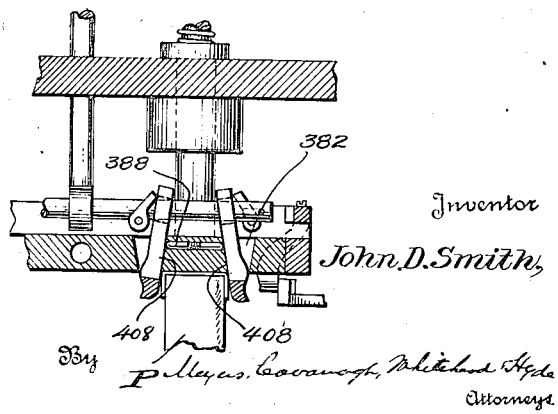

Fig. 30 is a similar view showing the parts in still another operative position.

Figs. 31 to 48 are diagrams showing different operative positions of the machine.

The machine is built on and about a main frame comprising side uprights 1 connected by horizontal side members 2 and a table 3 resting on the uprights. Horizontal members 2 carry bearings 4 in which a forward driving shaft 5 is mounted and they also carry bearings 6 in which a rear driving shaft 7 is mounted. Shaft 7 may be the initial or main driving shaft of the machine, but usually it is itself driven by some driving member moving at a higher speed, such as a pinion 8, Fig. 5, carried by a shaft $8^a$ mounted in suitable bearings which are usually located on the horizontal frame member 2 at the other side of the machine, as viewed in Fig. 1, the shaft $8^a$ being shown out of position in Fig. 5, for the sake of clearness. Shaft $8^a$ is provided with a drive pulley 9, or the shaft may be driven in any other convenient way, and pinion 8 engages a larger gear 82 on shaft 7. Shafts 5 and 7 are connected to rotate at the same speed by sprockets 11 and a chain 13 (Figs. 1, 3, 4 and 5). The chain may be properly tensioned by an idler pulley 15 carried by an arm 17 adjustably mounted on a transverse bar 19, referred to hereafter.

Near the front end of the machine above the table is a group of stamp magazines 10. Near the rear end of the table are arranged a parallel series of package conveyors 12, the upper stretches of which run above the table level. The packages are brought forward by the conveyors in parallel rows and a pair of packages in each row (according to the arrangement provided for in the present embodiment) is located in stamping position below the point 14, Fig. 1. The arrangement of the stamp magazines corresponds to the arrangement of the packages in stamping position.

Figure 1:
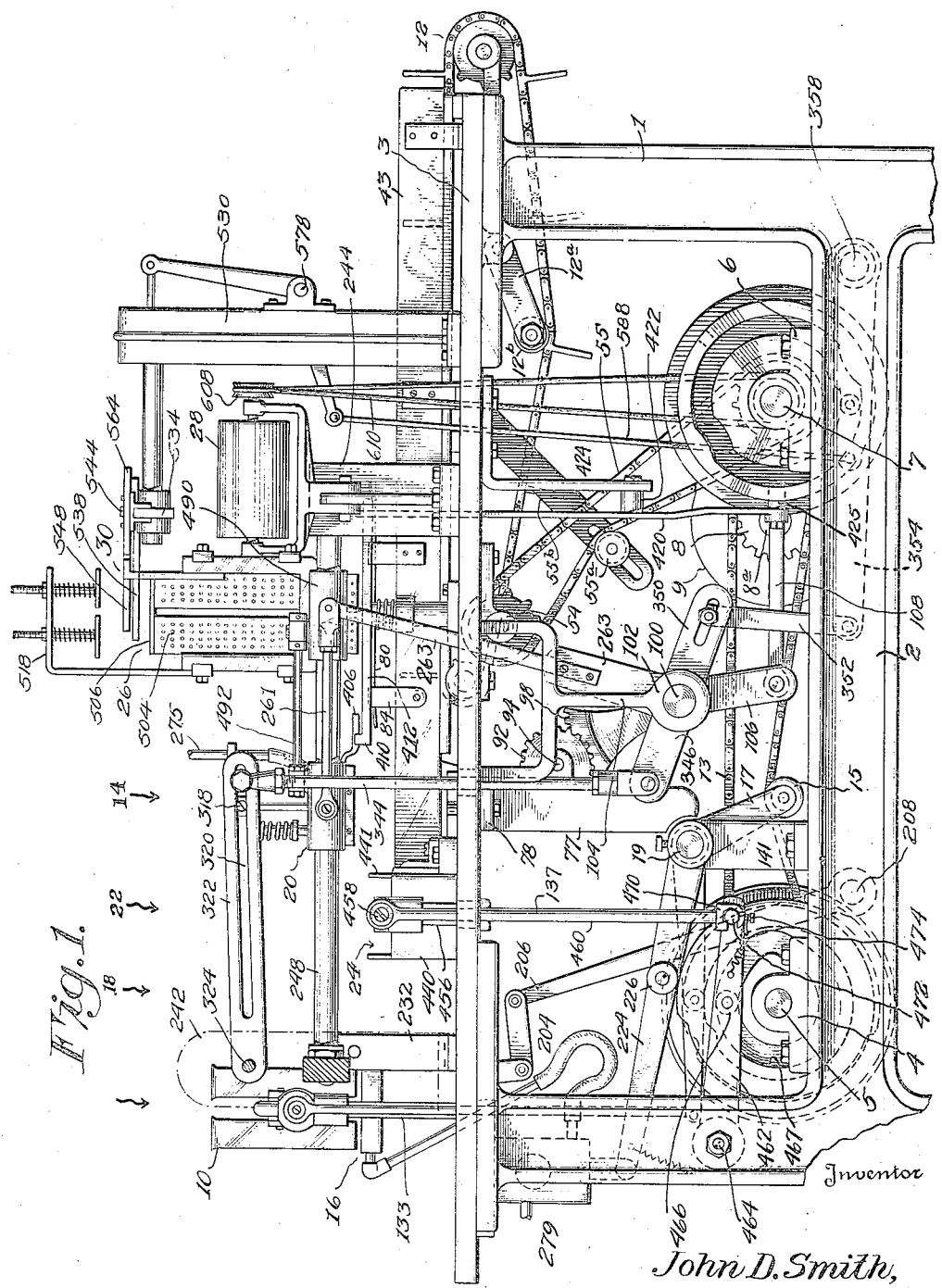
Fig. 1 is a side elevation of a machine embodying the invention.
Figure 4:
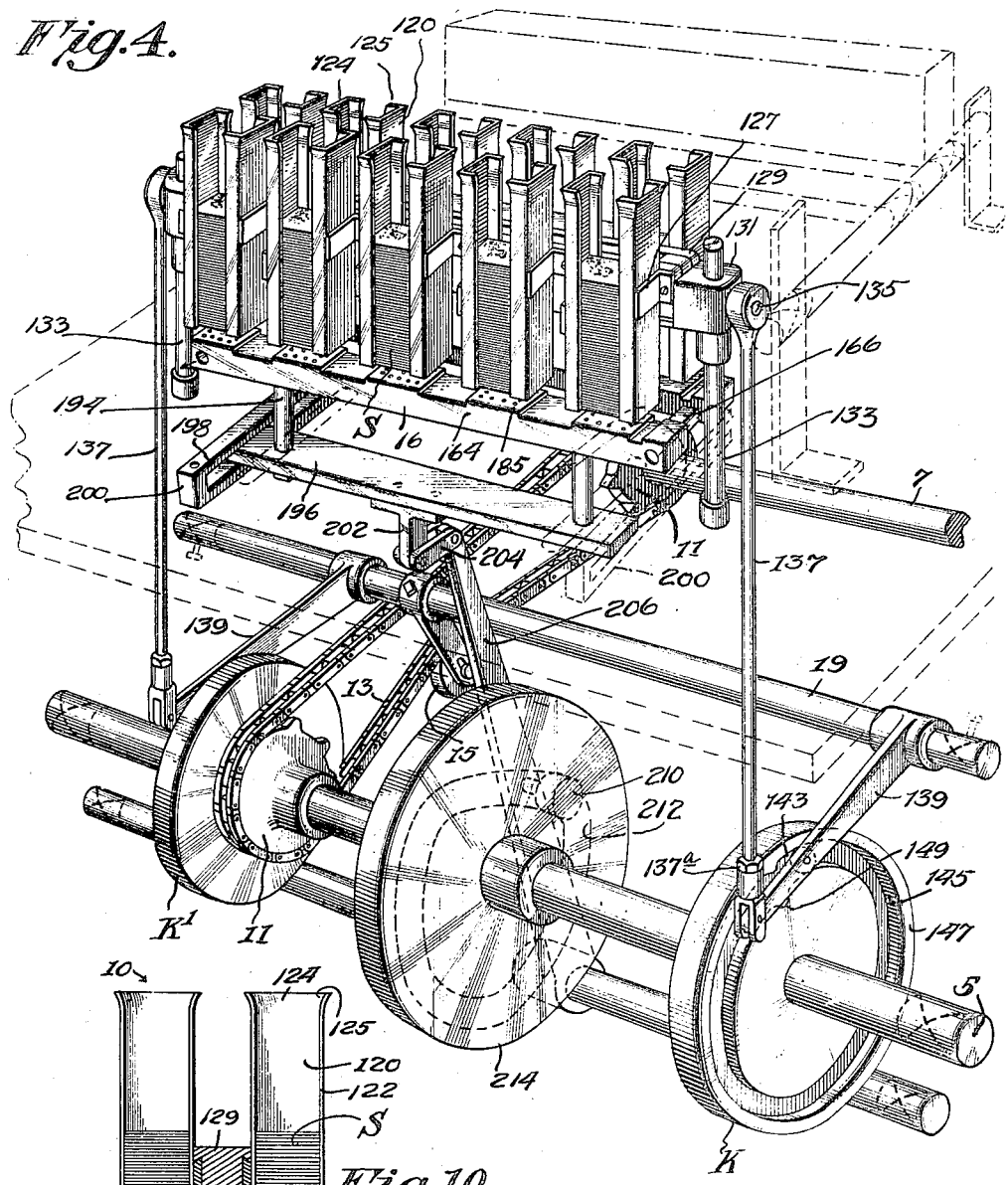
Fig. 4 is a perspective view of the front part of the machine showing mainly the label magazines and operating mechanism, label selecting or initial label gripping device and operating mechanism.

A stamp selector, or initial stamp gripper 16, Figs. 1 and 4, takes stamps simultaneously, one from each magazine, and moves them to a position substantially below the point 18, Fig. 1. At that point a movable stamp applying device 20 which may also be referred to at times as a secondary stamp gripping device, or otherwise, as a stamp transfer device, is brought over the initial stamp gripper 16; the stamps are transferred from the latter to the secondary gripper 20. They are then moved to a position substantially below the point 22, Fig. 1, and there the under surfaces of the stamps are adhesively conditioned by a gluing device 24. The secondary gripper or applying device 20 then moves to the stamping position 14 and by suitable operations applies one of the stamps to the top of each package. The applying device 20 then goes forward in another cycle of movements and a series of vertical package guides or channels 26 are brought to the position 14. All of the packages at stamping position are then moved up into the lower ends of the respective channels 26. The channel group 26 is then moved back to a point adjacent to a transverse conveyor 28 and packages appearing above the upper ends of the channels after successive operation cycles are seized by grippers 30 and removed to the conveyor 28 which carries them to the near side of the machine as viewed in Fig. 1 and deposits them on a longitudinal carry-off conveyor 32, for packaging or other disposition, (Figs. 2, 6 and 48).

Fig. 20 shows a package P of a sort for the labeling of which the invention in its present embodiment is especially designed. This is a typical cigarette pouch package in which a group of cigarettes is inclosed in an inner wrapper $w$, and this is inclosed in an outer or pouch wrapper $p$, which has an open top in which the folded upper end of the inner wrapper is exposed and usually projects slightly above the edge of the pouch wrapper. The package has an approximately rectangular form with more or less rounded corners and as it is presented for stamping, the contents consisting of the cigarettes and inner wrapping $w$ is in many cases entirely free from the pouch wrapper and it is desirable, therefore, that the application of the label, in the present case a revenue stamp, shall not only be to comply with the requirements of law, but shall serve at the same time to secure the inner package to the pouch wrapper. The packages are more or less compressible and need to be supported in certain ways for the best results. While the cigarette contents of the packages have considerable strength and rigidity in the vertical dimension of the package, as shown in Fig. 20, the package is compressible to a considerable extent in this direction due to the moderate looseness of the folds of the inner wrapper $w$ at the upper and lower ends of the package and to similar looseness of the pouch wrapper at the lower end. A stamp S is shown in the position in which it is most desirably initially applied to the package, that is with its central portion adhesively secured substantially centrally to the upper end folds of the inner wrapper $w$ and with its ends $e$ ready to be folded down against the broader sides of the pouch wrapper. Previous to application the stamp is, of course, adhesively conditioned on its lower face, most conveniently by applying glue. Desirably the proper folding of the stamp ends is facilitated by creasing or scoring the stamp along the lines $c$ previous to application to the package. After the initial application the ends are folded down and secured as shown in dotted lines at $e'$.

The machine in the present embodiment has been constructed to comply with the conditions and requirements above mentioned.

Figure 5:
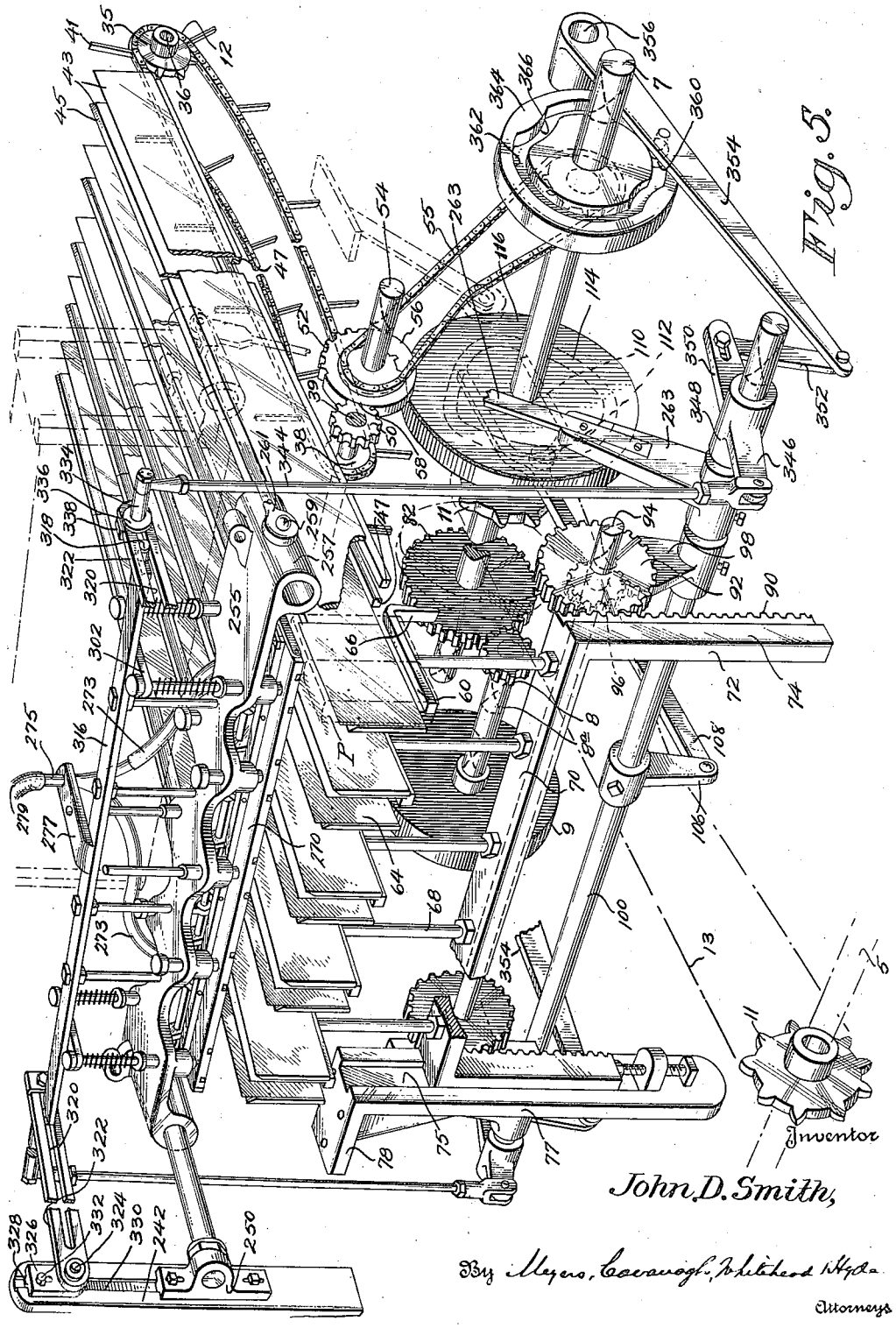
Fig. 5 is a perspective view showing mainly the label applying devices, package elevators, and package supply conveyors and associated parts.

The conveyors 12 for unstamped packages are arranged in a parallel series as best understood in Fig. 2, five conveyors being provided in the present instance. Each conveyor consists of a sprocket chain of ordinary link and block construction, running over a rear sprocket 35 (Figs. 1 to 5) on a shaft 36 and a front sprocket 38 on a shaft 39. At suitable intervals, somewhat greater than the length of two packages arranged on end with their narrow sides in contact, as best shown in Figs. 5 and 7, each conveyor is provided with a pushing blade 41, these blades being secured to suitable links of the chain. The upper flight of each conveyor runs between two upright guide boards 43, of such height that the upper ends of the packages extend considerably above their upper edges and desirably these edges of the guide boards are beveled inwardly as at 45. The guide boards are spaced apart to nearly fit the packages arranged in the positions shown, but to permit free sliding movement of the packages between them. At the bottom of each guide board is arranged at the corresponding side of the conveyor chain an inwardly projecting supporting rail 47, and these rails engage the lower ends of the packages and support them while they are pushed along by blades 41. The conveyor chains 12 are spaced apart a suitable distance to correspond with a convenient arrangement of the stamp magazines as later explained, and also to permit convenient arrangement and action of the stamp applying mechanism, as will be understood in a later description of that mechanism.
The package conveyors are simultaneously and intermittently driven in the following manner: Shaft 39 is provided with a pinion 50, Fig. 5, engaged by an interrupted gear 52 mounted on a shaft 54. The teeth of gear 52 extend about a small portion, usually about one-fourth of its periphery, and the remaining portion 56 of the periphery is circular, the circle being struck substantially on the pitch center of the gear teeth. The pinion 50 is of such diameter that its toothed circumference is of substantially the same length as the length of the toothed segment of gear 52, and to correspond with circular segment 56 of the gear, the pinion has a short concave segment 58, the co-operation of this concave segment with the circular periphery of the gear holding the pinion and its shaft and the conveyor chains stationary during the greater part of each revolution of the gear until the first tooth of the gear strikes the pinion and thereupon the pinion is rotated one turn during a part turn of the gear and thereafter the pinion is again held stationary. Gear 52 and pinion 50 may, if desired, be duplicated at the opposite side of the machine. Shaft 54 is driven by sprockets and a chain 55 from shaft 7. At each rotation of the pinion each conveyor is moved forward one step and at each rest of the conveyor two packages are brought to the foremost conveyor position, as clearly seen in Fig. 5, with the rear one of the two packages resting against the foremost blade 41. The blade 41 which was previously in advance of this pair of packages is now turned about shaft 39 and hangs downward. The next movement of the conveyors advances the pair of packages over the rails 47 and places them upon an elevator 60, the last part of the movement of the packages upon the elevator being accomplished by the angular action of the blade 41 as it turns about shaft 54. The packages are stopped by the rear wall 441 of a glue tank 440, later described.

One of these elevators is located in front of each package conveyor and is arranged to move vertically between the forward ends of guide boards 43, and to additionally guide and support the packages laterally in this position, which is the stamping position, the guide boards are provided with inner thin plates 64, the upper edges of which extend somewhat above the upper edges of the guide boards and engage and support the wide sides of the packages up to a point close to the lower margins of the stamp ends $e$, Fig. 20, when turned down against the sides of the packages. Each elevator, which may also be described as a support for the pair of packages in stamping position, has a downwardly turned rear end 66 confronting the space between the front ends of package supporting rails 47. Each elevator is carried by a rod 68 and these rods are secured to a cross piece 70 having vertical end members 72 provided with vertical ribs 74 engaging channels 75 in vertical guide members 77 which have angular ends 78 bolted to the underside of the table.

Normally the elevators are in the position shown in Fig. 5, that is substantially flush with the lower ends of the packages as the packages are delivered from the conveyors. Shortly after the packages are positioned stamps are applied to them and the pairs of packages are thereafter simultaneously moved up by the elevators into the lower ends of the vertical guide and brush channels 26, as later explained.

The packages are placed in pairs on the conveyors 12 by hand or by any suitable automatic feed mechanism, and from that time on they are automatically advanced, positioned on the elevators, stamped, elevated and discharged.

The inner wrapper $w$, Fig. 20, usually has upper exposed flaps $w'$, $w^2$, and these are usually not adhesively secured, and, therefore, may spring upward more or less during conveyance toward the stamping position. It is desirable to provide means to insure that these flaps are properly turned down on the package tops at the time of stamp application, and for that purpose flap guiding and pressing devices are desirably provided, consisting of flat strips 80, Figs. 1 and 7, carried by cross pieces 82 and uprights 84 secured to certain of the guide boards 43, one of the guide strips 80 being provided over each conveyor channel. The rearward end 86 of each guide strip is desirably bent upward and is also desirably bent angularly in relation to the lateral dimension of the machine, so that, as the packages are usually arranged, the outermost flap, which tends to project upward more than the other, is substantially parallel with the rearward end of the guide strip as it approaches it, and is most effectively wiped down into position by the angular member of the guide strip; and from there on the horizontal portion of the strip retains and presses the flaps in position, and finally they are additionally pressed just before going to stamping position, by the slightly downwardly turned front ends 88 of the strips.

The elevator frame comprising the cross piece 70 and vertical members 72, is reciprocated at suitable intervals by the following means: The vertical members are provided on their rear faces with rack teeth 90 and these are engaged by gears 92 mounted on a transverse shaft 94 which has bearings in vertical guide members 77. Shaft 94 carries a pinion 96 engaged by a segment gear 98 fixed to an intermediate transverse shaft 100. This shaft is mounted in bearings 102 at the lower ends of frame brackets 104. An arm 106 is fixed to shaft 100 and is connected by a link 108 (see Fig. 5) to a cam yoke 110 straddling shaft 7 and the link is provided with a cam roller 112 engaging a cam groove 114 in a circular cam body 116 secured to shaft 7. The cam groove is contoured to give the proper rest and movements to the elevators, as will be sufficiently understood hereafter.

Figure 10:
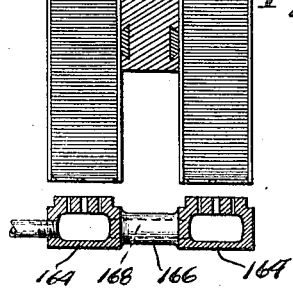
Fig. 10 is a detail in longitudinal section of an adjacent pair of label magazines with the selector or initial label gripper in operative relation.
Figure 11:
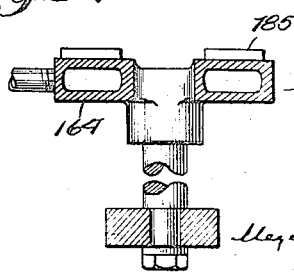
Fig. 11 is on enlarged detail in longitudinal vertical section of the label selector.

The stamp magazines 10, as best understood in Fig. 2, are arranged in pairs, the two magazines of each pair being in line with one of the package conveyors; or otherwise described the magazines are arranged in two parallel rows in the transverse direction of the machine, with five magazines in each row, corresponding to the arrangement of packages at the stamping position. Each magazine (Figs. 4 and 10) consists of two parallel vertical plates 120 having right-angled flanges 122 so that each plate with its flanges embraces a part of the end of each stamp in the stack of stamps S, leaving central portions of the stamps exposed so that the condition of the stack and its proper feeding can be easily noted. The upper end of each plate 120 and also the upper ends of the flanges 122 are desirably outwardly curved as at 124 and 125 to provide for easy insertion of stamps in groups to replenish the stack. The magazine plates 120 are secured by angle pieces 127 to a cross piece 129 and the ends of this cross piece are provided with lugs 131 apertured to slide on vertical posts 133, bolted to the table. The lugs 131 are provided with trunnions 135 engaged by the upper ends of links 137 and the lower ends of these links are connected to the ends of arms 139 which are movably mounted on transverse bar 19, previously mentioned. This bar is fixedly secured in the upper ends of uprights 141 resting on frame members 2, Fig. 1. Each of the arms 139 has a cam roller 143 running in a cam groove 145 formed in a circular cam body 147 and these cam bodies are mounted on shaft 5. Each cam groove has a short depressed portion 149 so that in each rotation of shaft 5 the two links 137 are momentarily pulled down through the movement of arms 139 and the group of stamp magazines is thus depressed to move the lowermost stamp in each stack into engagement with the initial stamp gripper 16.

The stack of stamps descends in each magazine by gravity, and means are provided to hold the stack by engaging the bottom stamp, and at the same time to permit withdrawal of the bottom stamp by a suitable picker or gripper, and particularly in the present embodiment by a pneumatic or suction gripping device. For this purpose (Figs. 10, and 13 to 18, inclusive), each plate 120 has centrally at its bottom edge an inwardly projecting narrow finger 154 terminating in a sharp inner edge 155. These two fingers of each magazine are opposite each other as best shown in Fig. 18 and engage centrally beneath the end of the lower stamp in the stack. In each of the side flanges 122 there is another finger or prong 157 projecting inward a short distance and desirably these prongs have downward and inwardly inclined upper faces 158; and these faces are arranged somewhat above the level of fingers 154. There is thus provided a pair of confronting prongs near each end of the lower stamp, engaging below the side edges of the stamp, the four prongs 157 of each magazine thus affording four angular points of support above the level of the two points of end support afforded by the fingers 154. This arrangement is one desirable arrangement to provide for progressive and easy withdrawal of the lower stamp without tending to dislodge other stamps and also to coöperate in an effective way with the suction selector or gripper now to be described.

This selector or initial gripper 16 (Figs. 1 to 4), is of substantially rectangular outline and comprises two main parallel portions 164, connected by end members 166. The main transverse members 164 are hollow and their hollow interiors are connected by air passages 168 in end members 166. The forward member 164 is bored to receive one or more pipe connections 170 and where there is more than one pipe connection they are connected by a transverse pipe 172 and this is in turn connected by a fitting 174 and a flexible hose connection 176 to a suction controlling valve 178. Hose connection 176 leads to a port 180 at the rear of the valve casing, and the casing also has a port 182 above port 180 and at the front of the casing for connection to the secondary stamp gripper or stamp applying device 20, as later explained. Each of the main transverse members 164 of the gripper has a plurality of raised flat surfaces 185, each corresponding in area to a stamp, and a plurality of holes are bored vertically through each of these faces communicating with the hollow interior of the gripper. Some of these, such as the holes 187, forming a rectangular outline near the periphery of the corresponding raised surface, may be of relatively small diameter and others, such as the central holes 189, may be considerably larger. When the suction gripper is positioned beneath the magazines, as shown in Fig. 4, and the magazines are lowered by the action of the cams and links 137 above described, the lower end of each magazine is close above one of the stamp receiving surfaces 185. A valve in the valve casing 178 is operated at about this moment to put the hollow interior of the suction head in connection with a suitable air exhausting device, such as an exhauster, or a tank connected with a suitable exhauster. Air rushing into the openings 187 and 189, as indicated in Fig. 14, first pulls down the central portion of the lower stamp until it engages the fingers 154. This down curving of the central portion of the stamp is assisted by the larger amount of air rushing through the large central hole 189. By this bending the stamp is shortened transversely as indicated in Fig. 14, and its side edges are then pulled down and out from above the angular faces 158 of prongs 157 and the stamp flattens out and approaches the surface 185, as in Fig. 15. The side edges of the stamp finally come entirely away from the prongs 157 and flatten down upon the gripper surface 185, as in Fig. 16, while the central end portions of the stamp are still engaged above the fingers 154. Finally external air pressure flattens down the central portions of the stamp ends upon the suction devices, pulling them away from the fingers 154, and a stamp is then firmly held on each suction surface 185, as in Fig. 17. These operations take place in a very brief space of time and and there is very little air admitted into the suction head since the valve is only opened to exhaust air from the head at about the instant that the magazines approach the suction surfaces, and as soon as the stamps are flattened out upon the suction surfaces external air is practically cut off. Other provisions are made in the machine to economize the air that has to be exhausted, as later appears. As soon as the stamps are withdrawn the magazines are elevated by the cam action as previously described.

The gripper or suction head 16 is carried on posts 194 which are bolted to a cross piece 196, and the ends of this travel in guide channels 198 in horizontal guide members 200 bolted to the under side of the table. Cross piece 196 is provided with a downwardly extending lug 202, and this is connected by links 204 to the upper end of a lever 206, fulcrumed on a transverse shaft 208. The lever has a cam roller 210 engaging in a cam groove 212 in cam body 214 on shaft 5. The cam groove is contoured so that the gripper 16 is positioned underneath the magazines just before the magazines descend, and after they rise it is shifted back to a position below the point 18, Fig. 1, and there retained while the secondary gripper or stamp applying device 20 is positioned above it and the stamps are transferred from the one to the other.

Valve casing 178 is connected by a pipe 220 to a suitable exhaust blower or to a tank from which air is exhausted, as previously stated and the latter arrangement is preferred, since partial vacuum maintained in a tank acts somewhat after the fashion of a balance wheel in providing a large space under low pressure into which air tends to be drawn whenever the valve is operated to connect one or another suction device with this chamber, and the small amount of air admitted at any time does not noticeably raise the pressure in the tank. An ordinary piston valve moves within the cylindrical valve casing to connect either port 180 or 182 with the suction tank and this valve is connected to a stem 222 and the stem is in turn connected to a lever 224 fulcrumed on the transverse bar 19 and provided with a cam roller 226 running on the periphery of a cam 228 which has elevated and depressed portions to operate the valve 70 in proper relation to the movement of the suction heads as will be sufficiently understood hereafter.

The transverse creases or score markings c, described in connection with Fig. 20, may be placed on the stamps as they are moved back toward position 18 by selector 16. For this purpose, as best shown in Figs. 1 and 19, the table has near the rear side of the rear row of magazines, uprights 232 braced by a cross piece 234; and a shaft 236 is rotatably mounted in bearings in the uprights. This shaft has a series of scoring wheels 238, the peripheries of which are suitably sharpened and the suction devices 185 are positioned at such a level that the stamps are squeezed between the surfaces and the scoring wheels, and score marks c are made, as clearly indicated in Fig. 19.

Near the front of the table at each side is an upright 242, and considerably farther back the table is spanned by a frame yoke 244. Horizontally supporting and guide bars 248 for the stamp applying mechanism 20 and the vertical brushing and conveyor channels 26 are provided, one near each side of the machine above the table, the front ends of these bars being secured in brackets 250 bolted to uprights 242 and the rear ends being secured in the frame yoke 244. The stamp applying mechanism proper, 20, has a main transverse plate 255 provided at each end with a sleeve 257 running on one of the bars 248. At the outer side each of these sleeves is provided with a stud or trunnion 259 and the forward ends of links 261 are pivotally connected to these trunnions and the rear ends of the links are connected to the upper ends of arms 263 which are rigidly secured to transverse shaft 100. This shaft is oscillated by link 108 and cam 116 as previously explained, to move the elevators 60, and at the same time arms 263 are oscillated and move the applying mechanism forward from position 14 to transfer position 18, with a pause at that point, and then back with a pause at gluing position 22, and then farther back to the stamping position 14, with a pause at that point for stamping, and so on.

Plate 255 carries a vertically movable suction head 270, (Figs. 5 and 21 to 30). This is substantially a plate of approximately rectangular outline comprising parallel main portions 272, which are substantially hollow or traversed by air channels 274 and connected by transverse members 276, through which pass air channels 278 connecting the channels or air spaces in the main members 272. The bottom of the suction head is provided with smooth stamp supporting surfaces 280 and 282, of which the surfaces 282 have a plurality of holes 284 bored through them to communicate with the hollow interior of the head, and these surfaces are of a length in the longitudinal direction of the machine substantially equal to the width of a stamp, and in the transverse direction of the machine are somewhat shorter than the length of the stamp. The spacing of these suction surfaces 282 is substantially the same as that of the suction surfaces 185 and when the suction head is moved forward and depressed one of the surfaces 282 lies just above the central portion of one of the surfaces 185, ready to receive a stamp released from the latter. Each stamp gripped centrally by one of the surfaces 282 extends across the channels mentioned below, and the ends of the stamp lie upon portions of the surfaces 280 (see Figs. 25 and 28).

The suction head is provided with one or more pipe connections 271 communicating with the hollow interior of the head members 272, and when more than one of these pipe connections is provided they are connected by pipes 273, with a pipe 275 (Figs. 1 and 2) carried by a bracket 277 secured to a cross piece of the stamp applying mechanism later referred to. Pipe 275 is connected by a flexible tube 279 to port 182 of valve casing 178. The arrangement of the valve in this casing is such that whenever one of the ports 180 or 182 is opened to suction from the suction tank the other port is closed to suction; and the valve is controlled by its operating mechanism including cam 228, so that suction is applied to suction head 272 when it is brought over the initial suction gripper 164 and depressed into stamp contact, and at substantially the same instant suction is cut off from the initial suction gripper to effect stamp transfer. The lower portion of the suction head is provided with transverse channels 288 accommodating stamp end pressing fingers 290, each of which is formed on the lower end of a body 292, Fig. 26. The channels 288 are interrupted by a central opening 294 formed between the two main portions 272 of the suction head and each of the end pressing fingers 290 spans this opening and portions of two opposite fingers of each pair co-operate for the pressing down of the ends of two different stamps.

The suction head is carried by a plurality of vertical rods 296 passing through sleeves 298 in plate 255. Each of these rods has a collar 300 to limit downward movement of the suction head. Each rod extends above the collar and through a hole in the end of a cross piece 302, there being two or more of these cross pieces, at least one located near each end of the plate 255. Each rod 296 is provided with a head 304 located above the cross piece 302. If desired the suction head may be provided with other rods 306 passing through sleeves 308 in the main plate and these rods may be provided with heads 310 located similarly to collars 300 to co-operate in limiting the downward movement of the suction head. A spring 312 is located about each rod 296 and compressed somewhat between the corresponding collar 300 and the end of cross piece 302. The cross pieces 302 are secured to a transverse bar 316, which serves to control the positioning of the suction head and end pressing fingers. At each end this bar has a roller 318 and each of these rollers engages in a long slot 320, formed in a longitudinal controlling bar or rail 322. These bars are pivoted at their forward ends on studs 324 carried by uprights 242 and desirably these studs are mounted on blocks 326 provided with flanges 328 movably mounted in channels 330 in the uprights and secured by bolts 332, so that the vertical positions of the front ends of the position controlling bars may be suitably regulated. At the rear end each of the controlling bars 322 is provided with a pivot connection comprising a stem 334, having a flange 336 and adjustably secured in slot 320 by a clip 338 and bolt 340. The outer end of the stem is pivotally connected to the upper end of a link 344 and the lower end of each of these links is pivotally connected to an arm 346 carried by a sleeve 348 movably mounted on shaft 100. Each sleeve 348 also has an arm 350 connected by a link 352 to a lever 354 fulcrumed at 356 on a transverse frame bar 358. Each lever 354 has a cam roller 360 engaging a cam groove 362 in a cam body 364 on shaft 7. The cam groove has two depressed or inwardly curved portions 366, suitably located to operate the levers 354, to depress the rear ends of guide bars 322 and so to depress cross bar 316, and the members connected to it, at suitable points, notably at the stamping position 14 and transfer position 18.

When cross bar 316 is depressed the suction head 272 is first permitted to drop by gravity, the rods 296 and 306 sliding down through sleeves 298 until collars 300 and 310 strike the upper face of plate 255, if no resistance is encountered by the suction head. However, when the suction head is depressed in stamping position, it carries stamps arranged in relation to each of the suction faces 282, as best shown in Fig. 28, and the stamps are first brought in contact with the upper ends of the packages P and movement of the suction head is thus arrested, before collars 300 strike the plate 255; and further downward movement of the cross bar 316 then compresses springs 312 and urges the suction head down with greater pressure until the collars are stopped by contact with the plate, as shown in Fig. 28. This provides for firm, but yielding, pressure upon the tops of the packages and the parts are arranged so that the wrappers are by this pressure properly compressed and held without applying sufficient pressure to injure the contained cigarettes.

The plates 292 which carry end pressing fingers 290 are provided near their upper ends with circular holes 370. A supporting and operating rod 372 passes through these holes of the entire series of pressing devices and the rod is controlled and moved vertically in relation to the suction head by stems 374 provided at their lower ends with eyes embracing the rod and secured at their upper ends by nuts 376 to cross bar 316. The pressing devices are arranged in pairs as best shown in Figs. 27 to 30, the end portions of each pair co-operating with one package, as above stated. Each of the plates 292 has on its back, or surface away from the package, rounded cam surfaces 378, which co-operate with angularly arranged faces 380 of slots 382 in suction heads 272. The lower inward face of each of the fingers 290 is rounded as at 384 to co-operate with the stamps and package ends, and the rearward lower edge 386 of each of the fingers also co-operates with the adjacent surface 380 under certain conditions. The suction plate is provided with spring plungers 388 located in holes 389 bored in the plate and these plungers are urged apart by springs 390, so that they slidably engage inner surfaces of the finger plate 292, as best understood by comparison of Figures 23 and 27. The holes 370 of the finger plates engage the rod 372 with a suitable clearance, as best shown in Fig. 23.

At each side of the series of finger plates 292, is a reciprocating releasing bar 392. These bars run on the upper surfaces of the suction head and are connected at the points 394 and 396 to a lever 398 fulcrumed at 400 on a plate 402 secured to the ends of the suction head members 272. Each of the bars 392 is provided with a series of dogs 404, those on one of the bars being all faced in the same direction and being arranged to operate similar ones of the pairs of finger plates 202; that is, the dogs 404 on the uppermost bar 392, as viewed in Fig. 24, operate on the right hand finger plate of each pair of plates, and the dogs on the other bar operate on the left hand plates of each pair. Thus when the end 406 of lever 398 is moved to the left in Fig. 24, one of the bars 392 is moved to the left and the other is moved to the right and the upper ends of the finger plates 292 are moved toward each other. This will also be understood in Fig. 27, in which the section plane is on the line 27—27 of Fig. 24, and each left hand dog of the pairs of dogs 404 is connected to a bar 392 which is omitted in this figure, and the right hand dog of each pair is connected to a bar 392.

When the stamp applying device 20 is brought to stamping position, carrying stamps adhesively coated and transferred to the lower surfaces of the suction head in the position indicated sufficiently by Fig. 28, the parts are in the position shown in Fig. 27. The controlling rails 322 are then depressed and the central portions of the stamps are first pressed upon the upper ends of the packages P and then additional pressure is applied by compression of springs 312, as previously described, bringing the parts into the position shown in Fig. 28. Further depression of cross bar 316 then still further compresses springs 312 without further downward movement of the suction head and in this movement the cross pieces 302 slide down on the rods 296 away from heads 304 and stems 374 move down rod 372 and this rod by engagement in the holes 370 of the finger plates 292 moves down the end pressing fingers. The rounded cam surfaces 378 of the finger plates now slide down the angular faces 380 of slots 382 and the contact points of plungers 388 with the finger plates are relatively shifted so that as shown in Fig. 29 the spring plungers exert a leverage against the pressing fingers which causes them to fulcrum on the rounded cam surfaces 378 against the lower edges of the slot surfaces 380. In this way the rounded pressing surfaces 384 of the pressing fingers first turn down the ends e of the stamps and then press these ends firmly against the sides of the packages, as indicated in Fig. 29. At this moment and a brief instant of time before the suction head is withdrawn vertically, the end 406 of lever 398 is moved as previously described and the dogs 404 act on the upper ends of the finger plates 292, which are now positioned opposite the ends of the dogs as shown in Fig. 29. This releasing movement is continued until, as shown in Fig. 30, the finger plates are brought to an upwardly converging angle and their inward faces are held against the angular inward surfaces 408 of slots 382, spring plungers 388 being meantime pressed inward, the angles of surfaces 408 being such that in this movement the pressing surfaces of the pressing fingers are moved outward slightly away from contact with the stamp ends and pressure on the packages is relieved. The suction head is then moved upward by elevation of the guide rails 322 and at about the same instant lever 398 is permitted to return to normal position so that all parts return to the position shown in Fig. 27.

Finger releasing lever 398 is operated as follows: The end 406 of this lever previously mentioned has a straight portion of considerable length substantially parallel to the horizontal dimension of the machine as sufficiently indicated in Figs. 1 and 2. This lever portion is opposed by an offset portion 410 of a lever 412 (Fig. 6) carried by a rod 414 journaled in a sleeve 416 secured to the table. A spring 418 coiled about the rod, and engaging the sleeve and the lever, urges the lever to move in such a direction as to retract offset 410 from the end 406 of the finger releasing lever. The opposite end of lever 412 is engaged by the upper end of a vertical lever 420 which oscillates in a transverse plane of the machine and is fulcrumed at 422 on a depending frame member 424. The lower end of this lever has a cam roller 425 (Figs. 1 and 8) and this runs against the side of a circular cam body 364 on shaft 7. At one point the cam body has a lateral projection 430 and at a proper time in the cycle of the machine this projection moves the vertical lever 420 so as to release the stamp-end-pressing fingers through the action of lever 412 and lever 398, as previously described. The relative arrangements of lever end 406 and lever offset 410 permit necessary movement of the stamp applying mechanism 20 and permit engagement registration of the two lever members so that the releasing action may be effected at the proper time.

At the forward end of its travel stamping mechanism 20 is in the position 18 which is directly above the rearward position of the initial stamp gripping member 16. At that point guide rails 322 are depressed somewhat by the appropriate one of the cam surfaces 366 of cam body 364 to bring the surfaces 382 of the stamp applying suction head into engagement with stamps carried by the initial gripping surfaces 185 and stamp transfer is effected by movement of the air valve as previously described. In the preferred arrangement the guide rails 322 have a slightly downward forward inclination as shown in Fig. 1, so that without movement of these rails the stamp applying suction head is depressed gradually to a certain extent as it approaches the forward end of the machine and the necessary additional depression required for stamp transfer is relatively small.

The stamp applying mechanism 20 is then retracted until it is in the position 22, that is the stamps carried by the applying suction surfaces are above the gluing mechanism 24. This comprises a tank 440, (Figs. 1, 2 and 6) resting on the table and filled with glue up to a suitable level. In this tank are a plurality of gluing plates 442 corresponding in arrangement with the stamps carried by the applying suction head. Each of these plates is provided with perforations 444, usually arranged in two or more rows on each surface to permit the ready passage of glue and prevent any undue adhesion of the gluing surfaces to the stamps. Each of the plates 442 is carried by a cross piece 446 having uprights 448 and these cross pieces are secured at proper intervals to a bar 450 which normally lies near the bottom of the tank and is connected by uprights 452 near the ends of the tank to horizontal end members 454 extending laterally beyond the ends of the tank. These members have channels co-operating with guide ribs 456 at the ends of the tank and also have studs or trunnions 458 pivotally connected to the upper ends of links 460 and the lower ends of these links are connected to the rear ends of levers 462 fulcrumed at 464 and provided with cam rollers engaging cam grooves 467 in the sides of cam bodies 468 on shaft 5. Desirably the connection of the lower ends of links 460 with their operating levers is by means of slotted heads 470, Fig. 1, engaging studs 472 on the levers and pivotally secured by set screws 474, so that the links may be easily disconnected to put the gluing mechanism out of action when desired. With the stamps positioned as above described, the gluing cross piece 450 is raised by its described mechanism and one of the gluing surfaces 442 is applied to each of the stamps for a brief moment of time sufficient to properly coat the under surface of the stamp with glue.

The stamp applying mechanism is then moved back to stamping position.

The vertical package receiving and stamp retaining channels or conveyers 26, (Figs. 1, 2, 6 and 7) are carried by a frame work comprising front and rear upper and lower cross pieces 480, 482, 484 and 486, connected to vertical side plates 488. This frame work is connected to sleeves 490 which run on the longitudinal bars 248, which also support the stamp applying mechanism. The entire unit 26 is connected to move with the stamp applying mechanism by connecting rods 492, bolted to eyes 494 and 491, respectively, on the main plate 255 of the applying mechanism and the sleeves 490 of the unit 26. The vertical package channels are thus moved longitudinally in accordance with the movement of the stamp applying mechanism and when the latter is at its forward position 18 the channels are positioned over the packages in stamping position 14 to receive the packages moved up by the elevators; and when the applying mechanism is in its rearward position 14 the package channels are in the position shown in Fig. 1 adjacent to the transverse conveyer 28 and the package delivery grippers 30.

Corresponding to each conveyer and elevator is a pair of vertical brush blocks 500, secured to the horizontal frame bars by angle pieces 502. These blocks are of a width substantially equal to the length of a pair of packages in the longitudinal plane of the machine, as best understood in Fig. 6, and of a length equal usually to several packages in endwise relation, as also shown in Fig. 6, where at least three packages vertically arranged are accommodated between each pair of brush blocks. The inner faces of the blocks are provided with brush bristles 504. While each side of the vertical channel formed by two opposed brush surfaces may consist of a single piece or block, more conveniently, two of the members 500 are placed at each side of the channel and in that case they are connected by end strips 506. To direct the packages into the vertical channels and to retain them against forward or backward displacement, each channel is provided with a vertical front rail 508 and a back rail 510, these rails being secured to cross pieces 480—484 and 482—486, respectively. The lower end 512 of each rail is bent outward to freely receive the upper ends of the packages. Above each vertical row of packages is arranged a yieldable stop consisting of plate 415 carried by a stem 516 passing through a horizontal arm 518 carried by a vertical member 520 secured to cross bar 480. Each of the stems is provided with a spring 522 to urge the stop downward until its movement is checked by a nut 524 adjustably screwed on the stem. These plates or abutments 514 yieldably check the packages as they are moved up by the elevators and hold them upright with their lower ends almost free from the channels.

When the mechanism 26 is moved to its forward position 14 a pair of packages is located on each of the elevators 60 with a stamp properly applied to each package and the elevators are in their lowermost positions. Thereupon the elevators are simultaneously raised and each pair of packages is moved between two of the brush surfaces of one of the brushing channels and between the divergent rail ends 512. The ends e of the stamps are thus additionally pressed down and retained and after three cycles of the machine are completed the vertical channels are substantially filled with packages by the successive upward movements of the elevators and in the fourth cycle a pair of packages is moved up, as indicated in Fig. 7 in dotted lines, against the stops 514, and the stops then return the packages to normal positions in the channels, with the upper pair of packages in each channel protruding considerably and ready for removal to suitable carry-off devices. On the return movement of the stamp applying mechanism 20, the vertical package channels 26 are moved back to the position shown in Fig. 7 and in that position the upper pair of packages of each column is seized by the gripping mechanism 30 and removed to the transverse carry-off belt 28.

The gripping mechanism (Figs. 1, 2, 6, 7, 9 and 12) comprises a frame yoke 530, the vertical legs of which rest on the table. Two horizontal guide bars 532 extend forward from the yoke, and on these is mounted a cross bar 534 having sleeves 536 embracing bars 532. Flat gripper rods 538 are provided with angular ends 540, secured to cross bar 534. A long plate 542 is located on top of cross bar 534 and is secured by screws 544 passing through slots 546 so that the plate may move laterally of the machine. Flat gripper rods 548, each of which co-operates with one of the rods 538, are secured to plate 542. Bar 534 has a lug 550, Fig. 9, and a spring 552 is tensioned between this and a lug 554 on plate 542. The spring tends to move the plate toward the left as viewed from the rear in Fig. 9, or toward the near side of Fig. 6. The plate 542 has at one end a narrow rounded end 556 co-operating with a cam plate 558 movably secured to an end of cross bar 534 by screws 560 passing through slots 562 in the cam plate. On its edge, directed toward plate 542, the cam plate has a straight surface 564 and at the rear end of this is an angular cam surface 566 leading to another straight surface 568 interrupted by a rounded notch 570. The cam plate 558 is reciprocated in relation to plate 542 by co-operation with a pin 572 mounted in an upper part of frame yoke 530 and desirably this pin may be the end of a screw so that its action upon the cam plate may be regulated. At the forward end of its travel the forward end of the cam plate encounters a lug 574 carried by an arm 576 and this may be carried by a part of the frame of the vertical brush channels, as shown, or by a stationary part of the machine. As cross bar 534 carrying the rest of the gripper mechanism moves forward the end 556 of plate 542 is in the rounded notch 570 of cam plate 558. The plate 542 is thus moved against the action of spring 552 so that gripper rod 548 of each pair of grippers is separated from the other gripper 538 of the pair, more than the width of a package, and the grippers are in this position as their forward ends come opposite to the pairs of packages, as shown in Fig. 7, with the gripper rods of each pair ready to seize a pair of packages projecting at the top of one of the vertical brush channels. At about this moment the forward end of the cam plate 558 strikes lug 574 and the cam plate is thus prevented from further movement while bar 534 moves slightly farther forward carrying the rounded point 556 of plate 542 out of the notch 570 and over the cam surface 556 and thereupon the spring 552 moves plate 542 to the left, as viewed from the rear, and so each pair of the gripper rods is brought together to grasp a pair of packages. Bar 534 then retreats with its grippers carrying a series of five pairs of packages until at about the end of the retreating movement the rear end of the cam plate strikes pin 572; the cam plate then stops and the end 556 of plate 542 is moved back by cam surface 566; the gripper bars are moved apart and the packages are dropped upon the upper stretch of conveyor belt 28, as shown in Fig. 6. Continued movement of bar 534 moves the point 556 of plate 542 into the notch 570 and the cycle is then repeated.

The gripper mechanism is moved to and fro by the following means: A shaft 578 is mounted in bearings on the rear of frame yoke 530. This shaft carries one, or more desirably, a pair of bell cranks 580, the upper arms of which are connected by links 582 to lugs 584 on cross bar 534. The other arm 586 of each bell crank is connected by a link 588 to the end of a lever 590 which has a cam roller 592 running in cam groove 594 of a cam body 596 on shaft 7. The rear ends of these levers are fulcrumed on cross bar 358, previously mentioned. The cam groove has a depressed portion 598 properly positioned to move the gripper frame back and forth in proper relation to movements of the vertical brushing frame.

Transverse carry-off belt 28 is carried by pulleys 600, 602, Fig. 6. These pulleys have shafts supported in yokes 604 and the yokes are connected to frame uprights 606. The shaft of the belt pulley 602 has a driving pulley 608 connected by a driving belt 610, which passes through a slot 612 in the table, to a driving pulley 614 on shaft 7. The packages are moved toward the near side of the machine, as viewed in Figs. 2 and 6 and discharged upon an inclined plate 616 and slide down over this plate onto the longitudinal discharge conveyor 32, previously mentioned, which may be mounted in any convenient way and driven by any suitable means either from the present machine, or since this longitudinal conveyor may in some cases be a part of some other mechanism to operate upon the packages, this belt may be driven by or concurrently with such other mechanism.

The operation of each group of the mechanism has been explained in the foregoing detailed description, but the operation of the entire machine will now be briefly described with reference to the diagrammatic views 31 to 48.

In Fig. 31 the main parts of the machine are diagrammatically outlined with the same reference characters applied to the parts, so far as possible, as in the previous description, two valves V and X, however, being shown for illustrative purposes, corresponding to parts of the single valve mechanism previously described for controlling the application of suction to the transfer gripper or stamping mechanism 20 and the initial gripper 16, respectively. In Fig. 31 essential parts of the applying mechanism, in addition to the suction head 272, are outlined, but in subsequent figures only the suction head and end pressing fingers 290 are outlined and other parts of this mechanism are represented by a rectangle Y, of which the upper line $y$ represents cross pieces 302, positioned by movements of the longitudinal guide rails 322, and the lower line $z$ represents the positions of collars 300 and, therefore, the relative distance between the lines $y$ and $z$ represents variations in the compression of springs 312, so that when these lines are close together it indicates that the springs are compressed to apply pressure to the suction head 272 as it rests on the packages and when these lines are far apart, as in Fig. 32, it indicates that the spring pressure is relieved.

Figure 34:
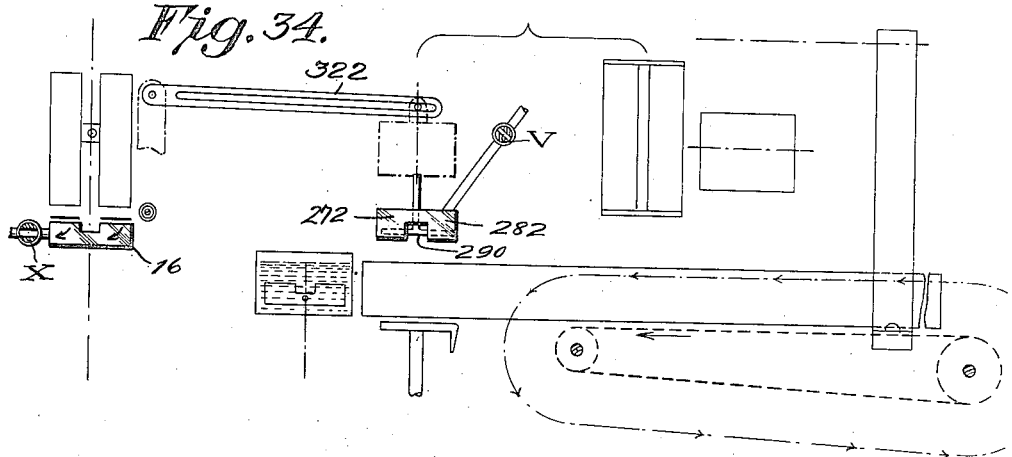
Figure 35:
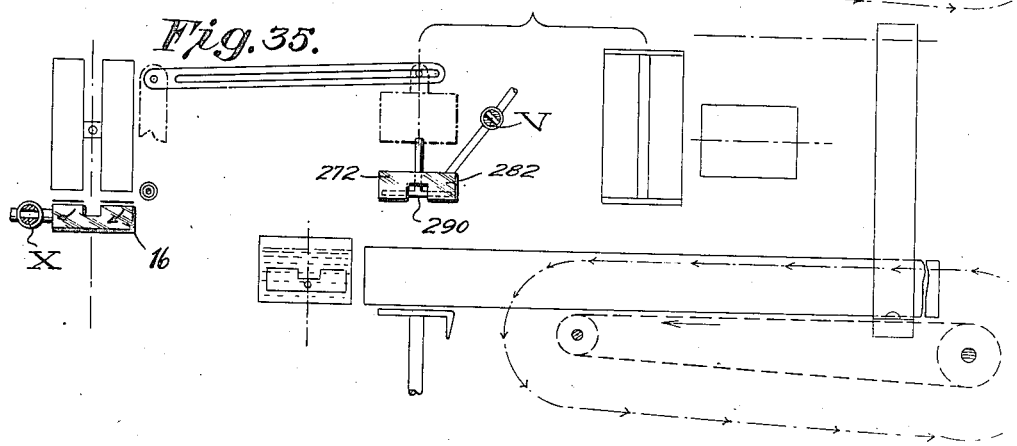
Figure 36:
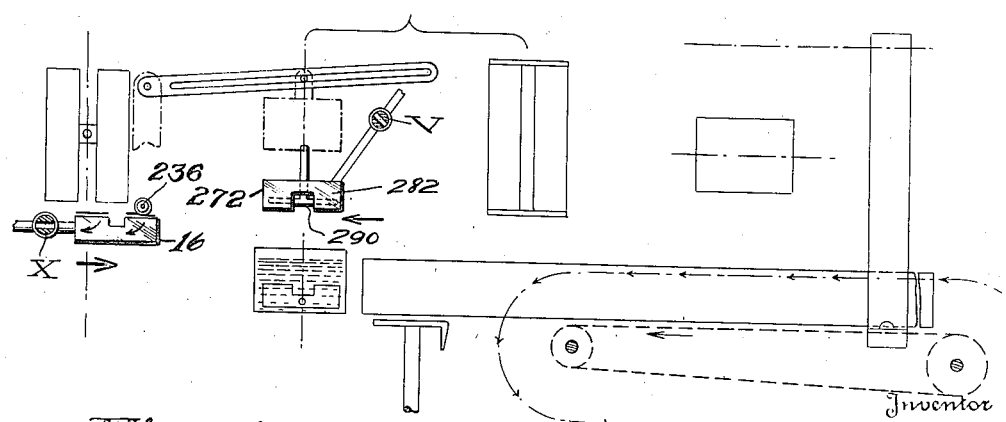

In Fig. 31 heavy lines direct attention to the forward end of the machine where the initial gripper 16 is in position below the stamp magazines 10 and the stamp magazines are elevated and valve X is closed, cutting off communication between the suction head 16 and the suction tank. At this time applying head 272 is in its rearmost position, but is elevated by the position of rails 322 and valve V is open so that suction is applied to the head to retain the stamps thereon. Rails 322 are now depressed as in Fig. 32, bringing the stamps held by surfaces 282 of the applying head into contact with the packages and at the same time the stamp magazines 10 are lowered, as indicated by the arrow, and valve X is opened and suction is applied to the stamps as also indicated by arrows on the head 16. Stamps are thus applied to the initial gripper. In Fig. 33 the rails 322 are further depressed and the upper and lower lines of rectangle Y are brought closer together, indicating compression of the springs and the end pressing fingers 290 have been moved down to press the ends of the stamps on the sides of the packages. The stamps are indicated in position on head 16 and the stamp magazines are moved up, as indicated by the arrow. The guide rails 322 are now raised as indicated in Fig. 34, withdrawing the end pressing fingers and pressure is taken from the applying head as indicated by extension of the rectangle Y. Further elevation of the guide rails 322 in Fig. 35 raises the applying head 272 from the packages. The initial gripper 16 then commences to move rearward as in Fig. 36, and the applying head 272 at the same time moves forward. In this movement of gripper 16 the scoring wheels 238 score the stamps, as indicated at $c$, Fig. 20. The described movement of the heads continues until in Fig. 37 the applying head 272 is over the gripper head 16. The applying head is then lowered, as indicated by the arrow in Fig. 38, in proximity to the gripper head 16, and at about this instant valve X is closed and valve V is opened, applying suction to the suction surfaces of the upper head, as indicated by arrows, and the stamps are transferred to the applying head. The applying head is then raised, as in Fig. 39, and the two commence to move back toward the front and rear ends of the machine, respectively, until as indicated in Fig. 40, the applying head is over the glue tank 440. The gluing surfaces 442 are raised and applied to the stamps as indicated by the arrow and then withdrawn. Movement of the two heads then continues until, as in Fig. 41, they have reached their limits of movement with the applying head in stamping position and the initial gripper below the magazines. A pair of packages P is approaching stamping position and in Fig. 42 it has been positioned on an elevator 60, and the applying head has brought the stamps into contact with the upper ends of the packages and the springs have been compressed, indicated by compression of the rectangle Y. The stamps are also released from the head as indicated by closed position of valve V. Further downward movement of the guide rail 322 in Fig. 43 brings the end pressing fingers 290 down over the sides of the packages and the ends of the stamps are wiped down and pressed. The end pressing fingers are then retracted in Fig. 44, and in Fig. 45 the applying head is raised. It is then moved forward, as indicated by the arrow and the connected conveyor and pressing channels 26 are moved forward with the applying head and positioned over the elevator in Fig. 46 where the elevator has commenced to rise to introduce its packages into the lower end of one of the vertical channels. Fig. 47 shows the channels after several cycles of operation with the elevator retreating downward and the uppermost packages supported almost free from the brush channels by stops 514, Fig. 7. The channels 26 have been moved back in proximity to the lateral conveyor 28 and this (Fig. 47), of course, corresponds to the completion of another cycle of movements of the applying head which is at the same time again in stamping position. The grippers 30 are now moved rearward, as shown in Fig. 48 and discharge their packages upon the transverse conveyor, and this figure also shows the operative condition of the rear portion of the machine after several cycles have been completed with a series of packages discharged from the transverse conveyor over the plate 616 and upon the longitudinal carry-off conveyor 32, the advance of the packages in these movements being clearly indicated by arrows.

Certain refinements in details of construction may be mentioned as follows: Various operating parts may be provided with adjustments, for instance, as indicated in connection with links 137 of the stamp magazines. These links may be provided with adjustments 137$^a$, Figs. 3 and 4, and similar screw and lock nut adjustments may be provided for other links when necessary or desirable. The idler pulley 15 and its support 17 for taking up slack in connecting chain 13 has been described. Similar devices may be provided for the conveyor chains 12, comprising arms 12$^a$ and idler pulleys 12$^b$ running on the lower stretches of the chains. Also for chain 55, Fig. 1, an idler pulley 55$^a$ may be provided, adjustably mounted in a slot in a depending frame arm 55$^b$. In general, to prevent binding of the parts and insure uniform operation without strain, the driving parts and connections have been duplicated at opposite sides of the machine, as described in connection, for instance, with the stamp magazines, gluing members, rails 322 for positioning the stamping head, etc. Similarly, the intermittent driving gearing 50—52, Fig. 5, for the package conveyors 12 may be duplicated at the opposite end of shaft 54.

While the machine desirably consists, as in the specific embodiment described, of subordinate instrumentalities organized and combined as described, it will be evident that in a broader aspect of the invention it is not limited to a combination of such subordinate instrumentalities, but that certain of these subordinate combinations of parts may be varied considerably.

What I claim is:—

1. In labeling mechanism, means for placing packages successively in labeling position in a plurality of rows with a plurality of packages in each row, means for grasping individual labels corresponding in number to the packages, means for adhesively conditioning the labels, and means for applying the labels simultaneously to the packages.

2. In labeling mechanism, means for placing packages successively in labeling position in a plurality of rows with a plurality of packages in each row, means for grasping individual labels corresponding in number to the packages, means for adhesively conditioning the labels, means for applying one of them to each package, and means for turning projecting label ends down against sides of the packages.

3. In labeling mechanism, means for placing packages successively in labeling position in a plurality of rows with a plurality of packages in each row, means for grasping individual labels corresponding in number to the packages, means for adhesively conditioning the labels, means for applying one of them to each package, and means for removing the packages from labeling position.

4. In labeling mechanism, means for placing packages successively in labeling position in a plurality of rows with a plurality of packages in each row, means for grasping individual labels corresponding in number to the packages, means for adhesively conditioning the labels, means for applying one of them to each package, means for turning projecting label ends down against sides of the packages, and means for removing the packages from labeling position.

5. In labeling mechanism, means for placing packages successively in labeling position in a plurality of rows with a plurality of packages in each row, means for grasping individual labels corresponding in number to the packages, means for adhesively conditioning the labels, means for applying one of them to each package, and means for removing the packages from labeling position and retaining the labels in applied positions.

6. In labeling mechanism, means for placing packages successively in labeling position in a plurality of rows with a plurality of packages in each row, means for grasping individual labels corresponding in number to the packages, means for adhesively conditioning the labels, means for applying one of them to each package, means for turning projecting label ends down against sides of the packages, and means for grasping and removing the packages from labeling position and concurrently retaining the labels in applied positions.

7. In labeling mechanism, means for placing packages successively in labeling position in a plurality of rows with a plurality of packages in each row, label magazines corresponding in number to the packages at labeling position, means for grasping an individual label from each magazine, means for adhesively conditioning the labels, and means for applying each label to one of the packages.

8. In labeling mechanism, means for placing packages successively in labeling position in a plurality of rows with a plurality of packages in each row, label magazines of number and arrangement corresponding to the packages at labeling position, means for grasping an individual label from each magazine, each label corresponding in position to one of the packages, means for adhesively conditioning the labels, and means for applying each label to its appropriate package.

9. In labeling mechanism, means for placing packages successively in labeling position in a plurality of rows with a plurality of packages in each row, label magazines corresponding in number to the packages at labeling position, means for grasping an individual label from each magazine, means for adhesively conditioning the labels, means for applying each label to one of the packages, and means for moving the packages from labeling position.

10. In labeling mechanism, means for placing packages successively in labeling position in a plurality of rows with a plurality of packages in each row, label magazines of number and arrangement corresponding to the packages at labeling position, means for grasping an individual label from each magazine, each label corresponding in position to one of the packages, means for adhesively conditioning the labels, means for applying each label to its appropriate package, and means for moving the packages from labeling position.

11. In labeling mechanism, means for placing packages successively in labeling position in a plurality of rows with a plurality of packages in each row, label magazines corresponding in number to the packages at labeling position, means for grasping an individual label from each magazine, means for adhesively conditioning the labels, means for applying each label to one of the packages, and means for removing the packages from labeling position.

12. In labeling mechanism, means for placing packages successively in labeling position in a plurality of rows with a plurality of packages in each row, label magazines of number and arrangement corresponding to the packages at labeling position, means for grasping an individual label from each magazine, each label corresponding in position to one of the packages, means for adhesively conditioning the labels, means for applying each label to its appropriate package, and means for grasping and removing the packages from labeling position and retaining the labels in position.

13. Labeling mechanism comprising means for successively positioning a plurality of pairs of packages in labeling position, magazines for individual labels corresponding in number to packages at labeling position, means for simultaneously removing a label from each magazine, means for adhesively conditioning the labels and moving them to applying position, and means for applying one of the labels to each package.

14. Labeling mechanism comprising means for successively positioning a plurality of pairs of packages in labeling position, magazines for individual labels corresponding in number and arrangement to packages at labeling position, means for simultaneously removing a label from each magazine, means for adhesively conditioning the labels and moving them to applying position, means for applying one of the labels to each package, and means for removing the packages from labeling position.

15. Labeling mechanism comprising means for successively positioning a plurality of pairs of packages in labeling position, magazines for individual labels corresponding in number to packages at labeling position, means for simultaneously removing a label from each magazine, means for adhesively conditioning the labels and moving them to applying position, means for applying one of the labels to each package, and means for turning down projecting ends of the labels against sides of the packages.

16. Labeling mechanism comprising means for successively positioning a plurality of pairs of packages in labeling position, magazines for individual labels corresponding in number and arrangement to packages at labeling position, means for simultaneously removing a label from each magazine, means for adhesively conditioning the labels and moving them to applying position, means for applying one of the labels to each package and turning down projecting ends of the labels against sides of the packages, and means for removing the packages from labeling position.

17. Labeling mechanism comprising means for positioning packages for labeling in a plurality of parallel rows, a plurality of magazines for individual stamps corresponding in number to packages at labeling position, means for initially grasping and removing a label from each magazine simultaneously, applying mechanism, means for transferring the labels simultaneously from the initial grasping means to the applying mechanism, means for adhesively conditioning the labels, and means for actuating the applying mechanism to apply the labels simultaneously to the packages.

18. Labeling mechanism comprising means for positioning packages for labeling in a plurality of parallel rows, a plurality of magazines for individual stamps corresponding in number to packages at labeling position, means for initially grasping and removing a label from each magazine simultaneously, applying mechanism, means for transferring the labels simultaneously from the initial grasping means to the applying mechanism, means for adhesively conditioning the labels while located on the applying mechanism, and means for applying labels simultaneously to the packages.

19. Labeling mechanism comprising means for positioning packages for labeling in a plurality of parallel rows, a plurality of magazines for individual stamps corresponding in number to packages at labeling position, means for initially grasping and removing a label from each magazine simultaneously, applying mechanism, means for transferring the labels simultaneously from the initial grasping means to the applying mechanism, means for adhesively conditioning the labels, means for applying the labels simultaneously to the packages, and means for turning down projecting ends of the labels against sides of the packages.

20. Labeling mechanism comprising means for positioning packages for labeling in a plurality of parallel rows, a plurality of magazines for individual stamps corresponding in number to packages at labeling position, means for initially grasping and removing a label from each magazine simultaneously, applying mechanism, means for transferring the labels simultaneously from the initial grasping means to the applying mechanism, means for adhesively conditioning the labels while located on the applying mechanism, means for applying labels simultaneously to the packages, and means for turning down the projecting ends of the labels against the sides of the packages.

21. Labeling mechanism comprising means for successively positioning packages for labeling in a plurality of rows with a plurality of packages in each row, magazines for individual labels corresponding in number to the packages at labeling position, a first suction head and means in connection therewith for removing simultaneously a label from each magazine, means for moving the suction head away from the magazines, an applying suction head, means in connection therewith for simultaneously taking all the labels from the first suction head, means for adhesively conditioning the labels, and means for moving the applying head to labeling position.

22. Labeling mechanism comprising means for successively positioning packages for labeling in a plurality of rows with a plurality of packages in each row, magazines for individual labels corresponding in number to the packages at label position, a first suction head and means in connection therewith for removing simultaneously a label from each magazine, means for moving the suction head away from the magazines, an applying suction head, means in connection therewith for simultaneously taking all the labels from the first suction head, means for adhesively conditioning the labels while carried by the applying head, means for moving the applying head to labeling position, and means for moving the head to apply the stamps simultaneously to the packages.

23. Labeling mechanism comprising means for successively positioning packages for labeling in a plurality of rows with a plurality of packages in each row, magazines for individual labels corresponding in number to the packages at labeling position, a first suction head and means in connection therewith for removing simultaneously a label from each magazine, means for moving the suction head away from the magazines, an applying suction head, means in connection therewith for simultaneously taking all the labels from the first suction head, means for adhesively conditioning the labels, means for moving the applying head to labeling position, and means associated with the applying head for pressing down projecting ends of the labels against sides of the packages.

24. Labeling mechanism comprising means for successively positioning packages for labeling in a plurality of rows with a plurality of packages in each row, magazines for individual labels corresponding in number to the packages at label position, a first suction head and means in connection therewith for removing simultaneously a label from each magazine, means for moving the suction head way from the magazines, an applying suction head, means in connection therewith for simultaneously taking all the labels from the first suction head, means for adhesively conditioning the labels while carried by the applying head, means for moving the applying head to labeling position, means for moving the head to apply the stamps simultaneously to the packages, and means associated with the applying head for pressing down projecting ends of the labels against sides of the packages.

25. Labeling mechanism comprising means for successively placing groups of packages in labeling position in a plurality of rows with a plurality of packages in each row, means for maintaining label supplies of number corresponding to the number of packages in labeling position, means for simultaneously grasping an individual label from each supply and transferring the multiplicity of labels toward labeling position and adhesively conditioning them during transfer, and means for applying the labels to the packages.

26. Labeling mechanism comprising means for successively placing groups of packages in labeling position in a plurality of rows with a plurality of packages in each row, label magazines of number corresponding to the packages in label position, means for simultaneously grasping an individual label from each magazine and transferring the multiplicity of labels toward labeling position and adhesively conditioning them during transfer, and means for applying the labels to packages.

27. Labeling mechanism comprising means for successively placing groups of packages in labeling position in a plurality of rows with a plurality of packages in each row, means for maintaining label supplies of number corresponding to the number of packages in labeling position, means for simultaneously grasping an individual label from each supply and transferring the multiplicity of labels toward labeling position and adhesively conditioning them during transfer, means for applying labels to the packages, and means for pressing down projecting ends of the labels against sides of the packages.

28. Labeling mechanism comprising means for successively placing groups of packages in labeling position in a plurality of rows with a plurality of packages in each row, label magazines of number corresponding to the packages in label position, means for simultaneously grasping an individual label from each magazine and transferring the multiplicity of labels toward labeling position and adhesively conditioning them during transfer, means for applying the labels to packages, and means for pressing down projecting ends of the labels against sides of the packages.

29. Labeling mechanism comprising means for successively placing groups of packages in labeling position in a plurality of rows with a plurality of packages in each row, means for maintaining label supplies of number corresponding to the number of packages in labeling position, means for simultaneously grasping an individual label from each suppy and transferring the multiplicity of labels toward labeling position and adhesively conditioning them during transfer, means for applying the labels to the packages, means for scoring the labels during transfer, and means for pressing projecting ends of the labels against sides of the packages.

30. Labeling mechanism comprising means for successively placing groups of packages in labeling position in a plurality of rows with a plurality of packages in each row, label magazines of number corresponding to the packages in label position, means for simultaneously grasping an individual label from each magazine and transferring the multiplicity of labels toward labeling position and adhesively conditioning them during transfer, means for applying the labels to packages, and means for scoring the labels during transfer, and means for bending the labels along the score lines and applying their ends to sides of the packages.

31. Labeling mechanism comprising means for successively placing groups of packages in labeling position in a plurality of rows with a plurality of packages in each row, means for maintaining label supplies of number corresponding to the number of packages in labeling position, means for simultaneously grasping an individual label from each supply and transferring the multiplicity of labels toward labeling position and adhesively conditioning them during transfer, means for applying labels to the packages, means for applying transverse folding scores to the labels during transfer, and means for bending the labels along the scores and applying the ends of the labels to sides of the packages.

32. Labeling mechanism comprising means for successively placing groups of packages in labeling position in a plurality of rows with a plurality of packages in each row, label magazines of number corresponding to the packages in label position, means for simultaneously grasping an individual label from each magazine and transferring the multiplicity of labels toward labeling position and adhesively conditioning them during transfer, means for applying the labels to packages, means for applying transverse folding scores to the labels during transfer, and means for bending the labels and applying their ends to sides of the packages.

33. Labeling mechanism comprising means for advancing successive groups of packages to labeling position, each group consisting of a plurality of rows with a plurality of packages in each row, means for maintaining individual label supplies corresponding in number and arrangement to the packages at labeling position, means for grasping an individual label from each supply and transferring the multiplicity of labels simultaneously to applying position, means for adhesively conditioning the labels, means for applying one of the labels to each package, and means for removing the packages of each group simultaneously from labeling position and retaining the labels in applied positions.

34. Labeling mechanism comprising means for advancing successive groups of packages to labeling position, each group consisting of a plurality of rows with a plurality of packages in each row, individual label magazines corresponding in number and arrangement to the packages at labeling position, means for grasping an individual label from each magazine and transferring the multiplicity of labels simultaneously to applying position, means for adhesively conditioning the labels, means for applying one of the labels to each package and turning down projecting label ends against the sides of the packages, and means for removing the packages of each group simultaneously from labeling position and retaining the labels in applied positions.

35. Labeling mechanism comprising means for advancing successive groups of packages to labeling position, means for maintaining individual label supplies corresponding in number to the packages at labeling position, means for grasping an individual label from each supply and transferring the multiplicity of labels simultaneously to applying position, means for applying one of the labels to each package, package conveying and pressing channels corresponding to the package arrangement at labeling position, and means for moving the labeled packages of each group simultaneously into the channels.

36. Labeling mechanism comprising means for advancing successive groups of packages to labeling position, individual label magazines corresponding in number to the packages at labeling position, means for grasping an individual label from each magazine and transferring the multiplicity of labels simultaneously to applying position, means for applying one of the labels to each package and turning down projecting label ends against the sides of the packages, package conveying and label retaining channels corresponding to the package arrangement at labeling position, and means for moving the labeled packages of each group simultaneously into the channels.

37. Labeling mechanism comprising means for advancing successive groups of packages to labeling position, means for maintaining individual label supplies corresponding in number to the packages at labeling position, means for grasping an individual label from each supply and transferring the multiplicity of labels simultaneously to applying position, means for applying one of the labels to each package, package conveying and pressing channels corresponding to the package arrangement at labeling position, and means for moving the labeled packages of each group simultaneously into the channels, the channels being dimensioned to receive a plurality of the groups of packages.

38. Labeling mechanism comprising means for advancing successive groups of packages to labeling position, individual label magazines corresponding in number to the packages at labeling position, means for grasping an individual label from each magazine and transferring the multiplicity of labels simultaneously to applying position, means for applying one of the labels to each package and turning down projecting label ends against the sides of the packages, package conveying and label retaining channels corresponding to the package arrangement at labeling position, and means for moving the labeled packages of each group simultaneously into the channels, the channels being dimensioned to receive a plurality of the groups of packages.

39. Labeling mechanism comprising means for advancing successive groups of packages to labeling position, means for maintaining individual label supplies corresponding in number to the packages at labeling position, means for grasping an individual label from each supply and transferring the multiplicity of labels simultaneously to applying position, means for applying one of the labels to each package, package conveying and pressing channels corresponding to the package arrangement at labeling position, and means for moving the labeled packages of each group simultaneously into the channels, the channels being provided with yieldable package engaging and brushing means to slidably retain the packages and press the labels in applied position.

40. Labeling mechanism comprising means for advancing successive groups of packages to labeling position, individual label magazines corresponding in number to the packages at labeling position, means for grasping an individual label from each magazine and transferring the multiplicity of labels simultaneously to applying position, means for applying one of the labels to each package and turning down projecting label ends against the sides of the packages, package conveying and label retaining channels corresponding to the package arrangement at labeling position, and means for moving the labeled packages of each group simultaneously into the channels, the channels being provided with yieldable package engaging and brushing means to slidably retain the packages and press the labels in applied position.

41. Labeling mechanism comprising means for successively placing groups of packages in labeling position, a plurality of individual label supplies corresponding in number to the packages at labeling position, means for simultaneously grasping one label from each of the supplies and transferring the multiplicity of labels to labeling position and adhesively conditioning them during transfer, means for applying the labels to the packages, a group of package conveying and pressing channels, means for positioning the channel group over the package group after label application, and means for moving the packages of each group simultaneously into the channels.

42. Labeling mechanism comprising means for successively placing groups of packages in labeling position, a plurality of individual label magazines corresponding in number to the packages at labeling position, means for simultaneously grasping one label from each of the magazines and transferring the multiplicity of labels to labeling position and adhesively conditioning them during transfer, means for applying the labels to the packages and pressing down projecting ends of the labels against the sides of the packages, a group of package conveying and pressing channels, means for positioning the channel group over the package group after label application, and means for moving the packages of each group simultaneously into the channels.

43. Labeling mechanism comprising means for successively placing groups of packages in labeling position, a plurality of individual label magazines corresponding in number to the packages at labeling position, means for moving the magazines simultaneously, means for simultaneously grasping one label from each of the magazines and transferring the multiplicity of labels to labeling position and adhesively conditioning them during transfer, means for applying the labels to the packages and pressing down projecting ends of the labels against the sides of the packages, a group of package conveying and pressing channels, means for positioning the channel group over the package group after label application, and means for moving the packages of each group simultaneously into the channels.

44. Labeling mechanism comprising means for successively placing groups of packages in labeling position, a plurality of individual label supplies corresponding in number to the packages at labeling position, means for simultaneously grasping one label from each of the supplies and transferring the multiplicity of labels to labeling position and adhesively conditioning them during transfer, means for applying the labels to the packages, a group of package conveying and pressing channels, means for positioning the channel group over the package group after label application, means for moving the packages of each group simultaneously into the channels, the channels being provided with yieldable package engaging and label pressing means.

45. Labeling mechanism comprising means for successively placing groups of packages in labeling position, a plurality of individual label magazines corresponding in number to the packages at labeling position, means for simultaneously grasping one label from each of the magazines and transferring the multiplicity of labels to labeling position and adhesively conditioning them during transfer, means for applying the labels to the packages and pressing down projecting ends of the labels against the sides of the packages, a group of package conveying and pressing channels, means for positioning the channel group over the package group after label application, and means for moving the packages of each group simultaneously into the channels, the channels being provided with yieldable package engaging and label pressing means.

46. Labeling mechanism comprising a plurality of label magazines each adapted to hold a stack of individual labels, a plurality of parallel package conveyors, elevators, one arranged to receive a package from each of the conveyors and to hold the package in labeling position, means for removing a label from each of the magazines, transferring the multiplicity of labels to labeling position and adhesively conditioning them, means for applying the labels simultaneously to the packages, and means for thereafter moving the elevators simultaneously to remove the packages from labeling position.

47. Labeling mechanism comprising a plurality of label magazines each adapted to hold a stack of individual labels, a plurality of parallel package conveyors, each in line with one of the magazines, means for moving the conveyors simultaneously and intermittently, movable elevators, one arranged to receive a package from each of the conveyors and to hold the package in labeling position, means for simultaneously removing a label from each of the magazines, transferring the multiplicity of labels to labeling position and adhesively conditioning them during transfer, means for applying the labels simultaneously to the packages, and means for thereafter moving simultaneously the elevators to remove the packages from label position.

48. Labeling mechanism comprising a plurality of label magazines each adapted to hold a stack of individual labels, a plurality of parallel package conveyors, elevators, one arranged to receive a package from each of the conveyors and to hold the package in labeling position, means for removing a label from each of the magazines, transferring the multiplicity of labels to labeling position and adhesively conditioning them, means for applying the labels simultaneously to the packages, a plurality of upright package receiving and label retaining channels, means for positioning the channels over the packages, and means for raising the elevators to move the group of packages simultaneously into the channels.

49. Labeling mechanism comprising a plurality of label magazines each adapted to hold a stack of individual labels, a plurality of parallel package conveyors, each in line with one of the magazines, means for moving the conveyors simultaneously and intermittently, movable elevators, one arranged to receive a package from each of the conveyors and to hold the package in labeling position, means for simultaneously removing a label from each of the magazines, transferring the multiplicity of labels to labeling position and adhesively conditioning them during transfer, means for applying the labels simultaneously to the packages, a plurality of upright package receiving and label retaining channels, means for positioning the channels over the packages, and means for thereafter raising the elevators to move the group of packages simultaneously into the channels.

50. Labeling mechanism comprising a magazine for stacks of individual labels, a plurality of package conveyors, supports to hold the packages in labeling position, one in line with each conveyor, a movable group of package conveying and label retaining channels, an initial label gripper arranged to simultaneously remove a plurality of labels from the magazine, label applying means connected with the channel group, means for transferring labels from the initial gripper to the applying means, means for adhesively conditioning the labels, and means for moving the package supports simultaneously to discharge the packages into the channels.

51. Labeling mechanism comprising a magazine for stacks of individual labels, a plurality of package conveyors, supports to hold the packages in labeling position, one in line with each conveyor, a movable group of package conveying and label retaining channels, an initial label gripper arranged to simultaneously remove a plurality of labels from the magazine, means for bringing the magazine and gripper into label-exchange relation, label applying means connected with the channel group, means for transferring labels from the initial gripper to the applying means, means for adhesively conditioning the labels, and means for removing the package supports simultaneously to discharge the packages into the channels.

52. Labeling mechanism comprising a plurality of magazines for stacks of individual labels, a plurality of package conveyors one in line with each of the magazines, means for moving the conveyors intermittently, supports to hold packages in labeling position, one in line with each conveyor, a movable group of vertical package conveying and label retaining channels, an initial label gripper arranged to simultaneously remove labels one from each magazine, label applying means connected with the channel group, means for transferring labels from the initial gripper to the applying means, means for adhesively conditioning the labels, and means acting after label application for moving the package supports simultaneously to discharge the packages into the vertical channels.

53. Labeling mechanism comprising a plurality of magazines for stacks of individual labels, a plurality of package conveyors one in line with each of the magazines, means for moving the conveyors intermittently, supports to hold packages in labeling position, one in line with each conveyor, a movable group of vertical package conveying label retaining channels, an initial label gripper arranged to simultaneously remove labels one from each magazine, means for moving the magazines toward the gripper, label applying means connected with the channel group, means for transferring labels from the initial gripper to the applying means, means for adhesively conditioning the labels, and means acting after label application for moving the package supports simultaneously to discharge the packages into the vertical channels.

54. In mechanism for applying individual labels simultaneously to a group of packages, means for positioning packages in groups for labeling, label applying means, a plurality of magazines each arranged to hold a stack of individual labels, each magazine having label retaining means at its lower end, a gripper head arranged to move below and away from the magazines and having perforated label receiving faces corresponding to each magazine, means for moving the head to label-transfer relation to the applying mechanism, and means for creating low pressure within the head when it is in operative relation to the magazines, and relieving the low pressure to release the labels when the head is in label-transfer position.

55. In mechanism for applying individual labels simultaneously to a group of packages, means for positioning packages in groups for labeling, label applying means, a plurality of magazines each arranged to hold a stack of individual labels, each magazine having label retaining fingers at its lower end, a gripper head arranged to move below and away from the magazines and having perforated label receiving faces corresponding to each magazine, means for moving the head, and means for creating low pressure within the head when it is in operative relation to the magazines.

56. In mechanism for applying individual labels simultaneously to a group of packages, means for positioning packages in groups for labeling, label applying means, a plurality of magazines each arranged to hold a stack of individual labels, each magazine having label retaining means at its lower end, a gripper head arranged to move below and away from the magazines and having perforated label receiving faces corresponding to each magazine, means for moving the head, means for creating low pressure within the head when it is in operative relation to the magazines, and means for bringing the magazines and gripper into label-exchange relation when the gripper surfaces are positioned below the magazine.

57. In mechanism for applying individual labels simultaneously to a group of packages, means for positioning packages in groups for labeling, label applying means, a plurality of magazines each arranged to hold a stack of individual labels, each magazine having label retaining fingers at its lower end, a gripper head arranged to move below and away from the magazines and having perforated label receiving faces corresponding to each magazine, means for moving the head, means for creating low pressure within the head when it is in operative relation to the magazines, and means for raising the magazines simultaneously and lowering them when the gripper surfaces are positioned below them.

58. In mechanism for applying individual labels simultaneously to a group of packages, a plurality of magazines each arranged to hold a stack of individual labels, each magazine having label retaining means at its lower end, a gripper head arranged to move below and away from the magazines and having perforated label receiving faces corresponding to each magazine, means for moving the head, means for creating low pressure within the head when it is in operative relation to the magazines, and label scoring means arranged to score the labels as they are moved away from the magazines on the gripper head.

59. In mechanism for applying individual labels simultaneously to a group of packages, a plurality of magazines each arranged to hold a stack of individual labels, each magazine having label retaining fingers at its lower end, a gripper head arranged to move below and away from the magazines and having perforated label receiving faces corresponding to each magazine, means for moving the head, means for creating low pressure within the head when it is in operative relation to the magazines, and a plurality of label scoring devices arranged to score the labels as they are moved away from the magazines on the gripper head.

60. In mechanism for applying individual labels simultaneously to a group of packages, means for positioning packages in groups for labeling, label applying means, a vertical label magazine for a stack of labels, having pairs of fingers near its lower end in vertically spaced relation, a suction gripper, means for moving the gripper to operative position below the magazine, means for applying suction whereby a single label is withdrawn progressively from engagement with the pairs of fingers, and means for transferring labels from the suction gripper to the label applying means.

61. In mechanism for applying individual labels simultaneously to a group of packages, means for positioning packages in groups for labeling, label applying means, a vertical label magazine for a stack of labels having near its lower end two pairs of label-side-engaging fingers and a lower pair of label-end-engaging fingers, a suction gripper, means for moving the gripper to operative position below the magazines, means for applying suction whereby a single label is withdrawn progressively from engagement with the different fingers, and means for transferring labels from the suction gripper to the label applying means.

62. In a mechanism for applying individual labels simultaneously to a group of packages, means for positioning packages in groups for labeling, label applying means, a vertical label magazine for a stack of labels, having pairs of fingers near its lower end in vertically spaced relation, a suction gripper, means for moving the gripper to operative position below the magazine, means for applying suction whereby a single label is withdrawn progressively from engagement with the pairs of fingers, means for moving the magazine vertically in relation to the gripper, and means for transferring labels from the suction gripper to the label applying means.

63. In mechanism for applying individual labels simultaneously to a group of packages, means for positioning packages in groups for labeling, label applying means, a vertical label magazine for a stack of labels having near its lower end two pairs of label-side-engaging fingers and a lower pair of label-end-engaging fingers, a suction gripper, means for moving the gripper to operative position below the magazine, means for applying suction whereby a single label is withdrawn progressively from engagement with the different fingers, means for moving the magazine vertically in relation to the gripper, and means for transferring labels from the suction gripper to the label applying means.

64. In mechanism for applying individual labels simultaneously to a group of packages, a magazine arranged to hold a stack of labels, a gripper arranged to move to and from operative relation to the magazine, means for applying a single stamp to the gripper when in operative relation to the magazine, and means for applying bending marks to the label as it is moved by the gripper away from the magazine.

65. In mechanism for applying individual labels simultaneously to a group of packages, a group of magazines arranged to hold stacks of labels, a gripper arranged to move to and from operative relation to the magazines, means for applying a single stamp from each magazine to the gripper when in operative relation to the magazines, and means for applying bending marks to the labels as they are moved by the gripper away from the magazines.

66. In a mechanism for applying individual labels simultaneously to a group of packages, means for positioning packages in groups for labeling, label applying means, a plurality of magazines each adapted to hold a stack of individual labels, a suction gripper having a label receiving surface corresponding to each magazine, means for moving the gripper toward and away from the magazines, means for lowering the magazines toward the gripper, means for applying suction when the gripper is below the magazines, another suction gripper having substantially corresponding label receiving surfaces, means for moving the second gripper to register its label surfaces with those of the first gripper, and means for applying suction to the second gripper and releasing suction in the first gripper to transfer the labels.

67. In mechanism for applying individual labels simultaneously to a group of packages, a plurality of magazines each adapted to hold a stack of individual labels, a suction gripper having a label receiving surface corresponding to each magazine, means for moving the gripper toward and away from the magazines, means for lowering the magazines toward the gripper, means for applying suction when the gripper is below the magazines, another suction gripper having substantially corresponding label receiving surfaces, means for moving the second gripper to register its label surfaces with those of the first gripper, means for applying suction to the second gripper and releasing suction in the first gripper to transfer the labels, and means for moving the second gripper away from label transfer position, a plurality of glue applying members, and means for elevating them simultaneously in one position of the second gripper to adhesively coat the labels.

68. A labeling machine comprising means for positioning packages for labeling, label applying mechanism, means for supporting the applying mechanism for horizontal movement toward and from labeling position, a guide member to control vertical movement of the labeling mechanism at labeling position, and means for moving the guide member.

69. A labeling machine comprising means for positioning packages for labeling, label applying mechanism, means for supporting the applying mechanism for horizontal movement toward and from labeling position, a guide member to control vertical movement of the labeling mechanism at labeling position, means for moving the guide member, a support for a supply of labels, and means for transferring labels from said supply to said labeling mechanism.

70. A labeling machine comprising means for positioning packages successively for labeling, a horizontal guide support, a label applying unit mounted for movement on said support and including a vertically movable applying member, a guide rail engaging said movable applying member, and means for moving the guide rail.

71. A labeling machine comprising means for positioning packages successively for labeling, a horizontal guide support, a label applying unit mounted for movement on said support and including a vertically movable applying member, a guide rail engaging said movable applying member, means for moving the guide rail, and means for supplying labels to said movable applying member.

72. A labeling machine comprising means for positioning packages successively for labeling, a horizontal guide support, a label applying unit mounted for movement on said support and including an applying member movable relative to said unit, a guide rail engaging said movable applying member, means for moving the guide rail, means for supplying labels to said movable applying member, and means for applying adhesive to labels carried by said movable applying member.

73. A labeling machine comprising means for positioning packages successively for labeling, horizontal guides, a labeling unit comprising a member slidably mounted on the guides, a labeling head mounted for vertical movement in the slidable member, approximately horizontal guide rails engaging the applying head, and means for moving the guide rails to raise and lower the applying head.

74. A labeling machine comprising means for positioning packages successively for labeling, horizontal guides, a labeling unit comprising a member slidably mounted on the guides a labeling head mounted for vertical movement in the slidable member, approximately horizontal guide rails pivotally mounted near one end and engaging the applying head, and means for moving the guide rails to raise and lower the applying head.

75. A labeling machine comprising means for positioning packages successively for labeling, horizontal guides, a labeling unit comprising a member slidably mounted on the guides, a labeling head mounted for vertical movement in the slidable member, approximately horizontal guide rails engaging the applying head, means for moving the guide rails to raise and lower the applying head, and means for applying labels to the head.

76. A labeling machine comprising means for positioning packages successively for labeling, horizontal guides, a labeling unit comprising a member slidably mounted on the guides, a labeling head mounted for vertical movement in the slidable member, approximately horizontal guide rails engaging the applying head, means for moving the guide rails to raise and lower the applying head, means for applying labels to the head, and means for applying glue to labels carried by the head.

77. A labeling machine comprising means for positioning packages successively for labeling, horizontal guides, a labeling unit comprising a member slidably mounted on the guides, a labeling head mounted for vertical movement in the slidable member, approximately horizontal guide rails engaging the applying head, a label holder and a transfer device to carry labels from the holder to a transfer position, and means for moving the guide rails to raise and lower the applying head at labeling position and at the transfer position.

78. In a labeling machine, label applying mechanism comprising guide rails, a body slidably mounted on the rails, a label suction head movably mounted in the body, label end pressing fingers mounted in the head and means for moving the head in relation to the body and for moving the end pressing fingers in relation to the head.

79. In a labeling machine, a main plate, a label suction head movable in relation to the main plate, means for moving the head, a plurality of end pressing fingers movably arranged near suction surfaces of the head, an operating member engaging the fingers, and means for depressing the fingers in relation to the head, moving them to pressing position, and retracting them from pressing position.

80. In a labeling machine, a main plate, a label suction head movable in relation to the main plate, means for moving the head and for applying yielding pressure to the head, a plurality of end pressing fingers movably arranged near suction surfaces of the head, an operating member engaging the fingers, and means for depressing the fingers in relation to the head, moving them to pressing position, and retracting them from pressing position.

81. In a labeling machine, a main plate, a label suction head movable in relation to the main plate, means for moving the head, means for limiting the movement of the head, a plurality of end pressing fingers movably arranged near suction surfaces of the head, an operating member engaging the fingers, and means for depressing the fingers in relation to the head, moving them to pressing position, and retracting them from pressing position.

82. Label applying mechanism for use in a machine comprising guide bars, a main plate slidably mounted on the bars, vertical rods slidably mounted in the plate, a label carrying suction head carried by the rods, a bar connected yieldably to the rods, stops to limit downward movement of the rods, a plurality of pairs of end pressing fingers located in recesses of the head, a rod movably engaging the fingers and connected with said bar and co-operating means on the head and said fingers for converging fingers of each pair to pressing position as they are depressed in relation to the head.

83. Label applying mechanism for use in a machine comprising guide bars, a main plate slidably mounted on the bars, vertical rods slidably mounted in the plate, a label carrying suction head carried by the rods, a bar connected yieldably to the rods, stops to limit downward movement of the rods, a plurality of pairs of end pressing fingers located in recesses of the head, a rod movably engaging the fingers and connected with said bar, co-operating means on the head and said fingers for converging fingers of each pair to pressing position as they are depressed in relation to the head, and means for retracting the fingers from pressing position while they are depressed.

84. A label applying head for labeling machines comprising a hollow body having a plurality of perforated label receiving faces, means for applying suction to the body, a plurality of pairs of fingers located in channels adjacent to the said label receiving faces, and means for moving the fingers in relation to the head.

85. A labeling machine comprising means for placing packages successively in labeling position, a label applying suction head having a label suction surface, means for applying suction to the head, means for moving the head to and from labeling position, end pressing fingers carried by the head adjacent to the suction surface, means for depressing the head when in label position, means for depressing and converging the fingers for label end pressing, and means for retracting the fingers from pressing position while they are depressed.

86. A labeling machine comprising means for positioning packages successively for labeling, a label applying unit movable to and fro, means for supplying labels to said unit, a vertical package receiving channel unit connected with the applying unit to move to and from labeling position, means for moving packages from labeling position into said channel unit, a transverse conveyor located near the channel unit when the latter is retracted from labeling position, and means for transferring packages from said unit to the conveyor.

87. A labeling machine comprising means for positioning packages successively for labeling, a label applying unit movable to and fro, means for supplying labels to said unit, a vertical package receiving channel unit connected with the applying unit to move to and from labeling position, means for moving packages from labeling position into said channel unit, a transverse conveyor located near the channel unit when the latter is retracted from labeling position, and a plurality of package grippers arranged to seize packages at the tops of the channels of said unit and transfer them to the conveyor.

88. Package receiving and discharging mechanism for labeling machines comprising a frame, a plurality of vertical package conveying and pressing channels carried by the frame, means for moving the frame to and fro, means for moving labeled packages into the channels when the frame is in one position, a transverse conveyor adjacent to the channels when the frame is in another position, and transfer grippers arranged to seize packages from the upper ends of the channels and transfer them to the conveyor.

89. In labeling mechanism, a frame, a plurality of upright package conveying and brushing channels therein, means for moving packages successively upward through the channels and yieldable stops at the tops of the channels to retain packages with their lower ends near the tops of the channels.

90. In labeling mechanism, the combination with a transverse conveyor and means for movably holding and pressing packages adjacent to the conveyor, of a package gripping and transferring unit comprising a movable frame, gripper rods thereon, a movable member on the frame co-operating with the gripper rods thereon, means for moving the frame, and means for moving the movable member to grip and release packages.

91. A labeling machine comprising a package conveyor, a movable package support, a label magazine, an initial suction gripper movable horizontally toward and from the magazine, means for raising and lowering the magazine to supply labels to the gripper, a label applying suction gripper, a main plate carrying the applying gripper and mounted to move between the magazine and the package support, means supporting the applying gripper for vertical movement in the plate, a longitudinal gripper operating rail pivoted at one end and slidably connected with the gripper, means for raising and lowering the free end of the rail, a pair of label end pressing fingers carried by the applying gripper, means for projecting said fingers below the gripper surface and for converging the fingers for pressing, a finger releasing device and means between said device and the fingers for retracting them from pressing position while depressed, a vertical package conveying channel connected to move to and fro with said main plate, means for moving the package support to introduce packages into said channel when it is in forward position, a transverse conveyor, and means for transferring packages from the channel to the conveyor when the channel is in rearward position.

92. A labeling machine comprising a package conveyor, a movable package support, a label magazine, an initial suction gripper movable horizontally toward and from the magazine, means for raising and lowering the magazines to supply labels to the gripper, a label applying suction gripper, a main plate carrying the applying gripper and mounted to move between the magazine and the package support, means supporting the applying gripper for vertical movement in the plate, a longitudinal gripper operating rail pivoted at one end and slidably connected with the gripper, means for raising and lowering the free end of the rail, a pair of label end pressing fingers carried by the applying gripper, means for projecting said fingers below the gripper surface and for converging the fingers for pressing, a finger releasing device and means between said device and the fingers for retracting them from pressing position while depressed, a vertical package conveying channel connected to move to and fro with said main plate, means for moving the package support to introduce packages into said channel when it is in forward position, a transverse conveyor, means for transferring packages from the channel to the conveyor when the channel is in rearward position, and gluers for applying adhesive to labels carried by the label applying gripper.

93. A labeling machine comprising a plurality of horizontal package conveyors, movable package supports, one at the end of each conveyor, a plurality of label magazines, a suction gripper movable horizontally toward and from the magazines, means for raising and lowering the magazines to supply labels to the gripper, a label applying suction gripper, a main plate carrying the applying gripper, means supporting the applying gripper for vertical movement in the plate, horizontal supporting guides for said main plate, longitudinal gripper operating rails each pivoted at one end and slidably connected with the gripper, means for raising and lowering the free ends of the rails, label end pressing means associated with the applying gripper, releasing means for said end pressing means, a group of vertical package conveying channels connected to move to and fro with said main plate, means for moving the package supports to introduce packages into said channels when the channel group is in forward position, a transverse conveyor, and means for transferring packages from the channels to the conveyor when the channel group is in rearward position.

94. A labeling machine comprising a plurality of horizontal package conveyors, movable package supports, one at the end of each conveyor, a plurality of label magazines, a suction gripper movable horizontally toward and from the magazines, means for raising and lowering the magazines to supply labels to the gripper, a label applying suction gripper, a main plate carrying the applying gripper, means supporting the applying gripper for vertical movement in the plate, horizontal supporting guides for said main plate, longitudinal gripper operating rails each pivoted at one end and slidably connected with the gripper, means for raising and lowering the free ends of the rails, label end pressing means associated with the applying gripper, releasing means for said end pressing means, a group of vertical package conveying channels connected to move to and fro with said main plate, means for moving the package supports to introduce packages into said channels when the channel group is in forward position, a transverse conveyor, means for transferring packages from the channels to the conveyor when the channel group is in rearward position, and means for gluing labels carried by the applying gripper.

95. A labeling machine comprising a plurality of horizontal package conveyors, movable package supports, one at the end of each conveyor, a plurality of label magazines, a suction gripper movable horizontally toward and from the magazines, means for raising and lowering the magazines to supply labels to the gripper, a label applying suction gripper, a main plate carrying the applying gripper, means supporting the applying gripper for vertical movement in the plate, supporting guides for said main plate, longitudinal gripper operating rails each pivoted at one end and slidably connected with the gripper, means for raising and lowering the free ends of the rails, a plurality of pairs of label end pressing fingers carried by the applying gripper, means for projecting said fingers below the gripper surface and for converging the fingers of each pair after pressing, a releasing device, means intermediate said device and the fingers for retracting the latter from pressing position while depressed, a group of vertical package conveying channels connected to move to and fro with said main plate, means for moving the package supports to introduce packages into said channels when the channel group is in forward position, a tranverse conveyor, and means for transferring packages from the channels to the conveyor when the channel group is in rearward position.

96. A labeling machine comprising a plurality of horizontal package conveyors, movable package supports, one at the end of each conveyor, a plurality of label magazines, a suction gripper movable horizontally toward and from the magazines, means for raising and lowering the magazines to supply labels to the gripper, a label applying suction gripper, a main plate carrying the applying gripper, means supporting the applying gripper for vertical movement in the plate, supporting guides for said main plate, longitudinal gripper operating rails each pivoted at one end and slidably connected with the gripper, means for raising and lowering the free ends of the rails, a plurality of pairs of label end pressing fingers carried by the applying gripper, means for projecting said fingers below the gripper surface and for converging the fingers of each pair after pressing, a releasing device, means intermediate said device and the fingers for retracting the latter from pressing position while depressed, a group of vertical package conveying channels connected to move to and fro with said main plate, means for moving the package supports to introduce packages into said channels when the channel group is in forward position, a transverse conveyor, means for transferring packages from the channels to the conveyor when the channel group is in rearward position, and means for applying glue to labels carried by said applying gripper.

97. A labeling machine comprising a plurality of horizontal package conveyors, movable package supports, one at the end of each conveyor, a plurality of label magazines, a suction gripper movable horizontally toward and from the magazines, means for raising and lowering the magazines to supply labels to the gripper, a label applying suction gripper having label receiving surfaces and channels adjacent to said surfaces, a main plate carrying the applying gripper, means supporting the applying gripper for vertical movement in the plate, supporting guides for said main plate, longitudinal gripper operating rails each pivoted at one end and slidably connected with the gripper, means for raising and lowering the free ends of the rails, a plurality of pairs of label end pressing fingers carried by the applying gripper and located in said channels, means for projecting said fingers below the gripper surface and for converging the fingers of each pair after pressing, a releasing device and means between said device and the fingers for retracting from pressing position while depressed, a group of vertical package conveying channels connected to move to and fro with said main plate, means for moving the package supports to introduce packages into said conveying channels when the channel group is in forward position, a transverse conveyor, and means for transferring packages from the conveying channels to the conveyor when the channel group is in rearward position.

98. A labeling machine comprising a plurality of horizontal package conveyors, movable package supports, one at the end of each conveyor, a pluraility of label magazines, a suction gripper movable horizontally toward and from the magazines, means for raising and lowering the magazines to supply labels to the gripper, a label applying suction gripper having label receiving surfaces and channels adjacent to said surfaces, a main plate carrying the applying gripper, means supporting the applying gripper for vertical movement in the plate, supporting guides for said main plate, longitudinal gripper operating rails each pivoted at one end and slidably connected with the gripper, means for raising and lowering the free ends of the rails, a plurality of pairs of label end pressing fingers carried by the applying gripper and located in said channels, means for projecting said fingers below the gripper surface and for converging the fingers of each pair after pressing, a releasing device and means between said device and the fingers for retracting from pressing position while depressed, a group of vertical package conveying channels connected to move to and fro with said main plate, means for moving the package supports to introduce packages into said conveying channels when the channel group is in forward position, a transverse conveyor, means for transferring packages from the conveying channels to the conveyor when the channel group is in rearward position, and means for applying glue to labels carried by the applying gripper.

Signed at Richmond in the county of Henrico and State of Virgina this 5th day of March A. D. 1921.

JOHN D. SMITH.